(12) United States Patent
Sasakura

(10) Patent No.: US 8,610,911 B2
(45) Date of Patent: Dec. 17, 2013

(54) PRINTING DEVICE, PRINTING SYSTEM, PRINTING CONTROL METHOD AND RECORDING MEDIUM

(75) Inventor: Miyoshi Sasakura, Higashiyamato (JP)

(73) Assignees: Casio Electronics Manufacturing Co., Ltd., Saitama (JP); Casio Computer Co., Ltd., Tokyo (JP)

( * ) Notice: Subject to any disclaimer, the term of this patent is extended or adjusted under 35 U.S.C. 154(b) by 288 days.

(21) Appl. No.: 13/233,895

(22) Filed: Sep. 15, 2011

(65) Prior Publication Data

US 2012/0069374 A1    Mar. 22, 2012

(30) Foreign Application Priority Data

Sep. 16, 2010    (JP) ................. 2010-208221

(51) Int. Cl.
*G06F 3/12* (2006.01)
(52) U.S. Cl.
USPC ....... 358/1.13; 358/1.15; 358/1.16; 358/1.17; 358/1.14; 710/59; 710/260; 710/263; 399/8; 399/21
(58) Field of Classification Search
None
See application file for complete search history.

(56) References Cited

U.S. PATENT DOCUMENTS

| | | | |
|---|---|---|---|
| 6,600,569 B1 * | 7/2003 | Osada et al. | 358/1.12 |
| 7,471,406 B2 * | 12/2008 | Tsuchitoi | 358/1.15 |
| 8,189,221 B2 * | 5/2012 | Matsumoto et al. | 358/1.15 |
| 2002/0131064 A1 * | 9/2002 | Maeda et al. | 358/1.13 |
| 2003/0184807 A1 * | 10/2003 | Tsuchitoi | 358/1.18 |
| 2005/0200889 A1 * | 9/2005 | Oomura | 358/1.15 |
| 2006/0044593 A1 * | 3/2006 | Kawakami et al. | 358/1.14 |
| 2006/0224559 A1 * | 10/2006 | Abiko | 707/1 |
| 2007/0223027 A1 * | 9/2007 | Shindo et al. | 358/1.13 |
| 2012/0045242 A1 * | 2/2012 | Yamada | 399/85 |

FOREIGN PATENT DOCUMENTS

| | | |
|---|---|---|
| JP | 10-177464 A | 6/1998 |
| JP | 11-312062 A | 11/1999 |

\* cited by examiner

*Primary Examiner* — Hilina K Demeter
(74) *Attorney, Agent, or Firm* — Holtz, Holtz, Goodman & Chick, PC

(57) ABSTRACT

A conversion unit converts a command part of an image inclusion command into an internal command. A first memory unit stores an image non-inclusion command and the internal command converted by the conversion unit. A second memory unit stores an image data part of the image inclusion command. A restart page number memory unit stores restart page number information when a print process being executed is interrupted in order to execute an interruption print process. When restarting the interrupted print process, a control unit executes control to read out the internal command and the image non-inclusion command stored in the first memory unit up to the page indicated by the restart page number information, and from the page indicated by the restart page number, further executes control to read out from the second memory unit the image data part following the internal command read out from the first memory unit.

20 Claims, 17 Drawing Sheets

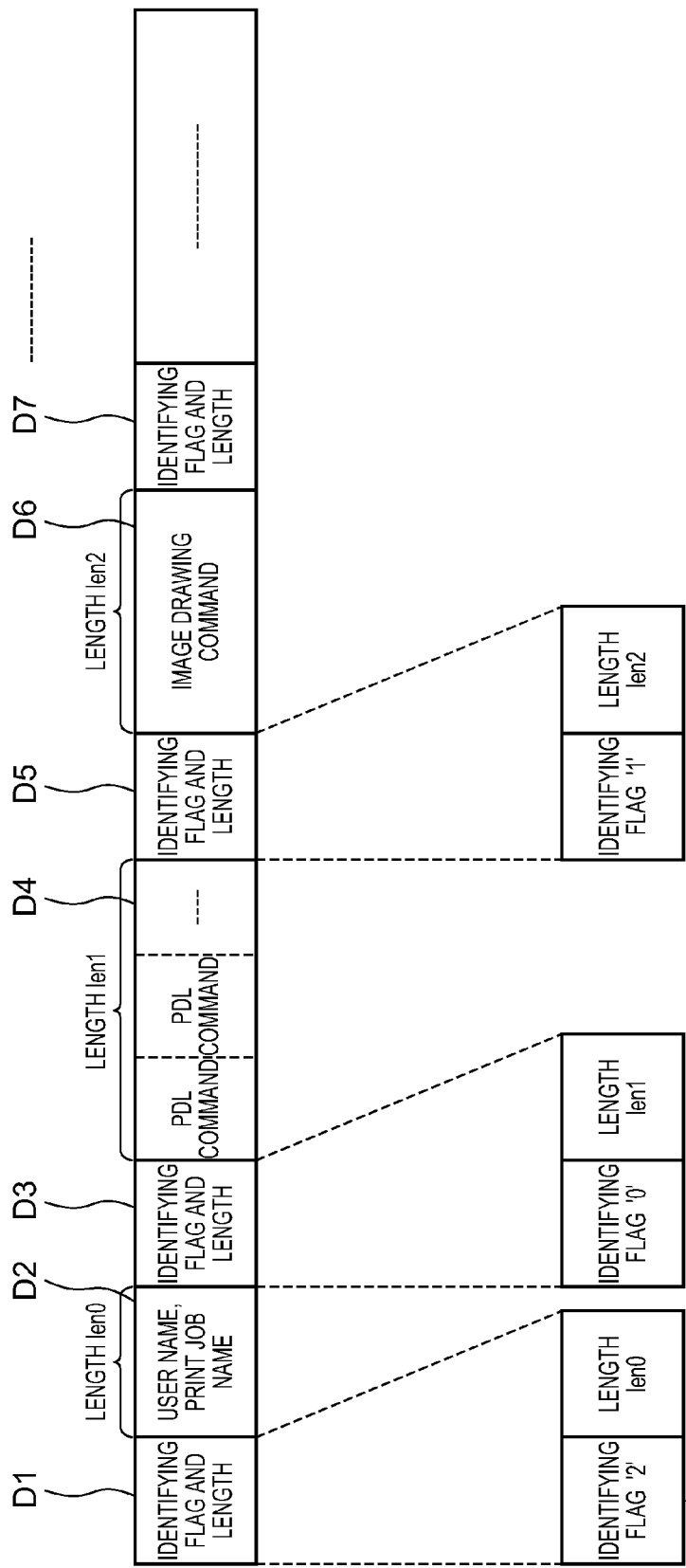

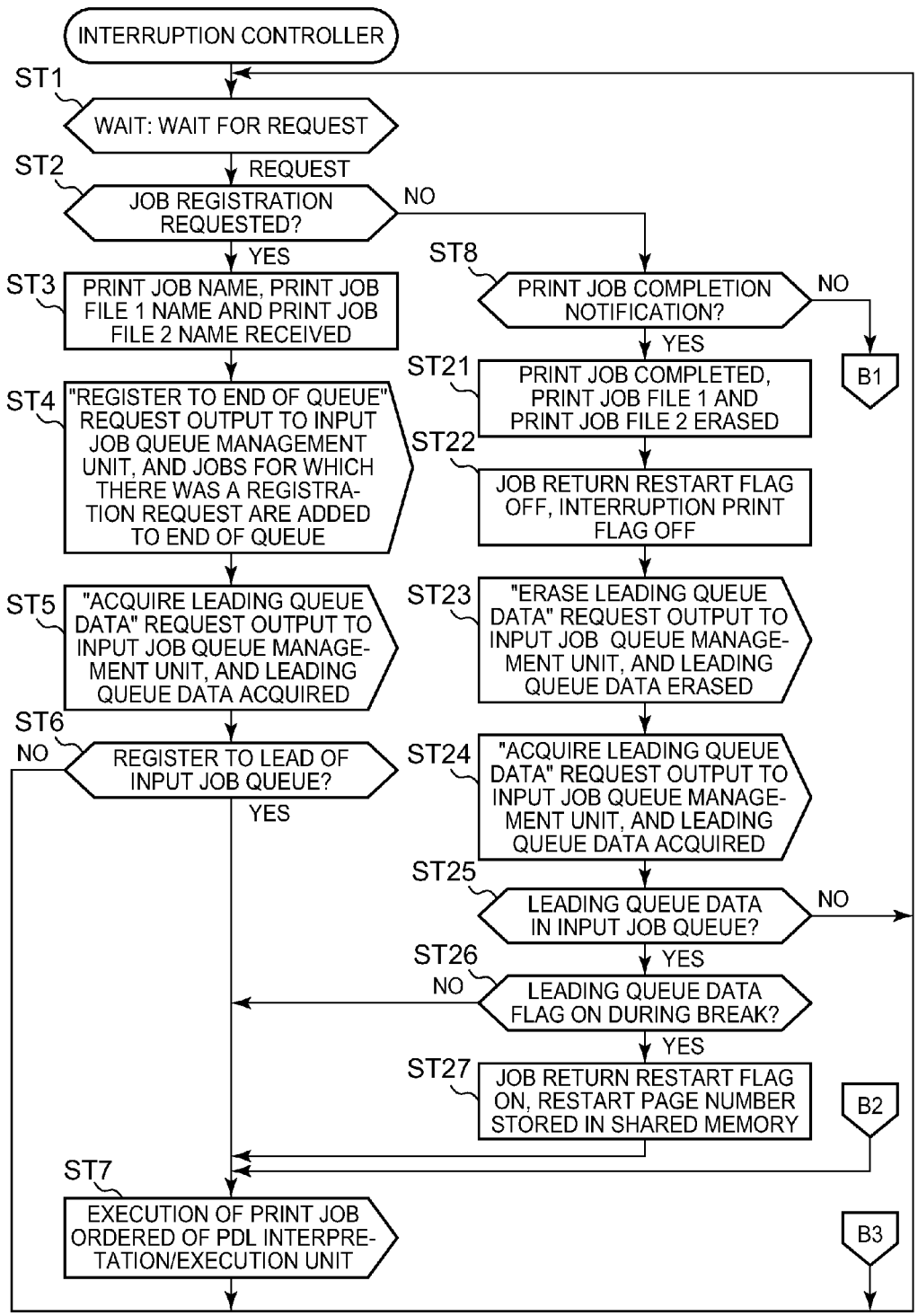

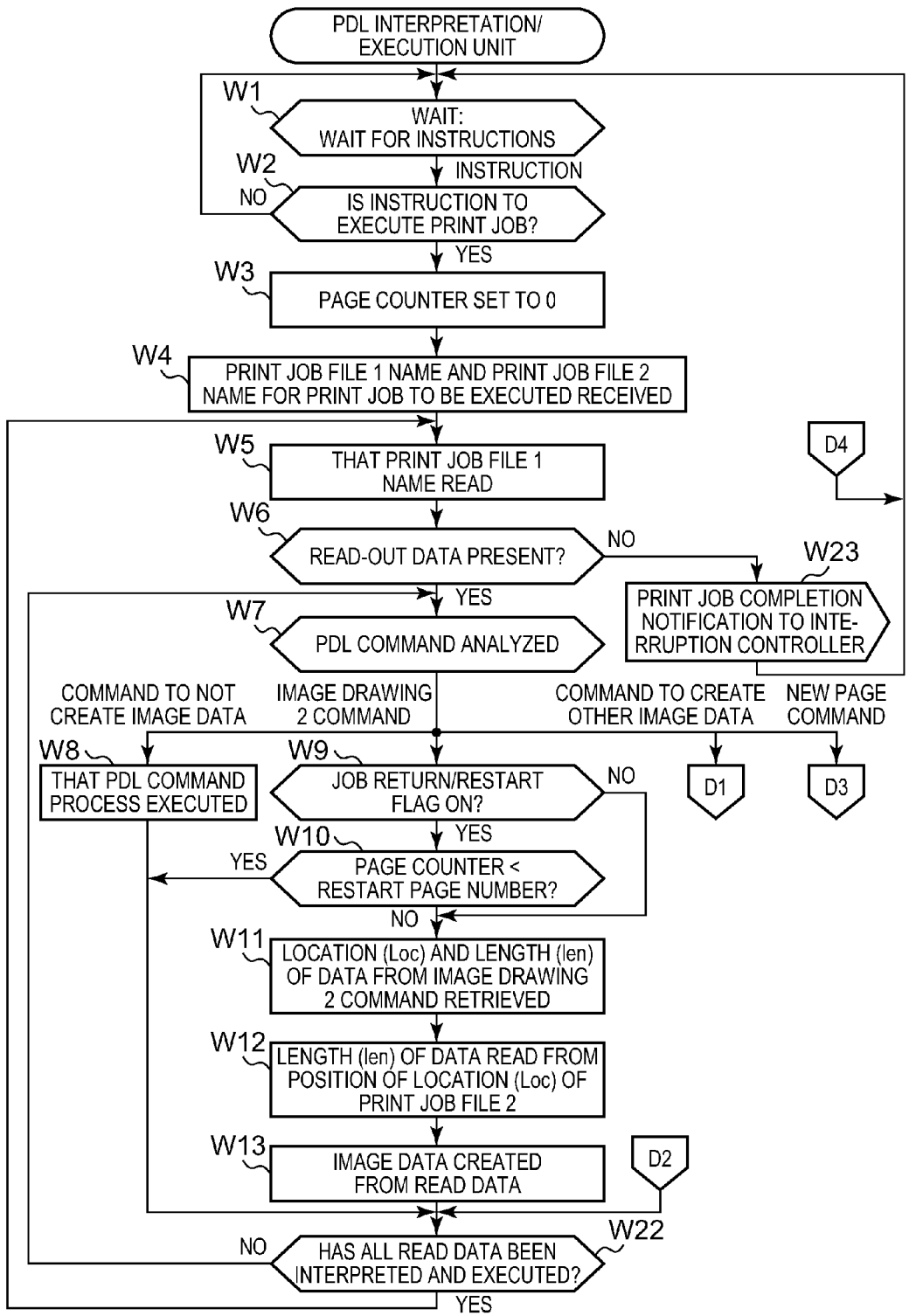

PRINTING DEVICE, PRINTING SYSTEM, PRINTING CONTROL METHOD AND RECORDING MEDIUM

CROSS-REFERENCE TO RELATED APPLICATION

This application claims the benefit of Japanese Patent Application No. 2010-208221, filed Sep. 16, 2010, the entire disclosure of which is incorporated by reference herein.

FIELD

This application relates generally to a printing device, a printing system, a printing control method and a recording medium capable of interruption printing.

BACKGROUND

Today, printing systems are utilized in which host equipment (a client device) such as a host computer and printing devices such as single-function printing devices and so-called all-in-one printing devices are connected via a network. In such a system, there is a high probability that while a print job requested from host equipment with a printing device is being processed, the next print job from different host equipment will be supplied to this printing device.

When print jobs compete, control is possible that does not accept processing of other print jobs until print processing of the first-arrived print job is concluded. However, in this case when the print system is viewed as a whole, efficiency declines and the system has poor user-friendliness. That is to say, while a print job requiring time until printing is completed is being processed first, print processing must wait even for small-volume print jobs needing short printing times. Consequently, when the printing system is considered as a whole, this is a system with poor efficiency as the number of print jobs in a waiting-to-print status increases.

In addition, users must wait a long time until print processing is completed when a print job requiring considerable time until the end of printing is processed first even when the desire is to urgently accomplish printing.

In consideration of the above problem, Unexamined Japanese Patent Application KOKAI Publication No. H10-177464 (hereafter referred to as "Patent Literature 1") and Unexamined Japanese Patent Application KOKAI Publication No. H11-312062 (hereafter referred to as "Patent Literature 2") have been disclosed. Even these Patent Literatures are inventions of printing devices having interruption processing for jobs during print processes, interruption printing of urgent print jobs, a reinstatement function for interrupted print jobs and an interruption printing function for executing restarted print processes for interrupted print jobs.

First, Patent Literature 1 discloses a printing control device having two operation modes, namely normal mode and non-printing mode, and operates in non-printing mode until the printing restart page is reached and operates in normal mode from the printing restart page on. The normal mode is an operating mode in which print jobs described in non-page-independent Page Description Language (hereafter called "PDL") received from a client device are stored in memory, each page of images is created in succession, and the created images are supplied to the printing device and printed. The non-printing mode is an operating mode in which images are not supplied to the printing device. The print control device disclosed in Patent Literature 1 is such that when printing is suspended, a printing restart page is calculated, and when a printing restart signal is received at the time of restarting printing, the suspended print job is processed from the beginning with reference to the job memory unit.

In addition, Patent Literature 2 discloses a printing device wherein the method of restarting a print job suspended by interruption printing is to interpret from the start the suspended print job data when restarting, and to execute print requests for each page. Here, with the printing device disclosed in Patent Literature 2, redundant printing is prevented by adopting a method in which print requests relating to pages already printed are invalid and only print requests for unprinted pages are valid.

However, with both devices, input print jobs are stored and when an interruption request is generated, the job currently being printed is interrupted at the end of a page, and the number of pages already printed or the number of the page to be restarted are stored, and after the interruption process of the print job is accomplished, interruption printing is executed. Moreover, with both devices, when interruption printing ends, command interpretation from the head of the interrupted print job is executed, and a reinstatement/restart process is executed that restarts the print process from the unprinted pages without executing printing of pages already printed. In this print job reinstatement/restart process, because command interpretation is executed from the head of the interrupted print job and a print image is created, the interpretation execution and print image creation are accomplished even for pages that have already been printed and output, requiring a long time until resumption of the print process.

Consequently, when the interruption printing function is used, time is needed to reinstate the interrupted print job (the preceding print job), and as a result this becomes an impediment when using the interruption print function. Accordingly, a printing device is desired that is capable of accomplishing in a short time a reinstatement/restart process from when execution of the interruption printing process ends until printing of the interrupted print job is restarted.

Furthermore, with the invention disclosed in Patent Literature 1, a method is disclosed in which a PDL command creating an image hard-wise is not executed to shorten job reinstatement time, but in this case, circuit size becomes large and in addition logic composition becomes complex, causing costs to rise. Consequently, a printing device is desired that has a relatively simple structure yet is capable of improving performance during interruption reinstatement.

In consideration of the foregoing problems, it is an object of the present invention to provide a printing device with a relatively simple structure and capable of improving performance during interruption reinstatement, a printing system, a print control method and a computer-readable recording medium that is not temporary and tangibly stores a program for realizing this.

SUMMARY

In order to achieve the above object, a printing device according to a first aspect of the present invention is a printing device for executing a print process on the basis of print data including an image inclusion command containing a command part and an image data part, and an image non-inclusion command containing a command part but not containing an image data part, this printing device comprising:

a conversion unit which converts the command part of the image inclusion command contained in the print data into an internal command;

a first memory unit which stores an internal command converted by the conversion unit and the image non-inclusion command contained in the print data;

a second memory unit which stores the image data part of the image inclusion command contained in the print data;

a restart page number memory unit which stores restart page number information corresponding to a page number for restarting the executed print process, when the print process being executed is interrupted in order to execute an interruption print process; and, a control unit that, when restarting the interrupted print process after execution of the interruption print process, reads out the internal command and the image non-inclusion command stored in the first memory unit in the print process up to the page indicated by the restart page number information stored in the restart page number memory unit;

wherein the control unit, when executing the restarted printing process from the page indicated by the restart page number information, reads out the internal command and image non-inclusion data from the first memory unit, and furthermore reads out from the second memory unit the image data part in accordance with the internal command read out from the first memory unit.

In order to achieve the above object, a printing system according to a second aspect of the present invention is a printing system comprising a host equipment and a printing device that are connected to each other via a network, wherein the host equipment (a) creates print data including an image inclusion command containing a command part and an image data part, and an image non-inclusion command containing a command part but not containing an image data part, and (b) sends the created print data to the printing device; and wherein the printing device comprises:
a receiving unit which receives the print data;
a conversion unit which converts the command part of the image inclusion command contained in the print data into an internal command;
a first memory unit which stores the internal command converted by the conversion unit and the image non-inclusion command contained in the print data;
a second memory unit which stores the image data part of the image inclusion command contained in the print data;
a restart page number memory unit which stores restart page number information corresponding to a page number for restarting the executed print process, when the print process being executed is interrupted in order to execute an interruption print process; and,
a control unit that, when restarting the interrupted print process after execution of the interruption print process, reads out the internal command and the image non-inclusion command stored in the first memory unit in the print process up to the page indicated by the restart page number information stored in the restart page number memory unit;

wherein the control unit, when executing the restarted printing process from the page indicated by the restart page number information, reads out the internal command and image non-inclusion data from the first memory unit, and furthermore reads out from the second memory unit the image data part in accordance with the internal command read out from the first memory unit.

In order to achieve the above object, a printing control method according to a third aspect of the present invention is a printing control method for executing a print process on the basis of print data including an image inclusion command containing a command part and an image data part, and an image non-inclusion command containing a command part but not containing an image data part, said printing control method comprising:

a step which converts the command part of the image inclusion command contained in the print data into an internal command;

a step which stores in a first memory unit the internal command converted by the conversion unit and the image non-inclusion command contained in the print data;

a step which stores in a second memory unit the image data part of the image inclusion command contained in the print data;

a step which stores, in a restart page number memory unit, restart page number information corresponding to a page number for restarting the executed print process, when the print process being executed is interrupted in order to execute an interruption print process;

a step which, when restarting the interrupted print process after execution of the interruption print process, reads out the internal command and the image non-inclusion command stored in the first memory unit in the print process up to the page indicated by the restart page number information stored in the restart page number memory unit; and a step which, when executing the restarted printing process from the page indicated by the restart page number information, reads out the internal command and image non-inclusion data from the first memory unit and furthermore reads out from the second memory unit the image data part in accordance with the internal command read out from the first memory unit.

In order to achieve the above object, a recording medium according to a fourth aspect of the present invention is a non-transitory computer-readable recording medium for storing a program that causes a computer to execute a print process on the basis of print data including an image inclusion command containing a command part and an image data part, and an image non-inclusion command containing a command part but not containing an image data part, said program causing the computer to execute:

a step which converts the command part of the image inclusion command contained in the print data into an internal command;

a step which stores in a first memory unit the internal command converted by the conversion unit and the image non-inclusion command contained in the print data;

a step which stores in a second memory unit the image data part of the image inclusion command contained in the print data;

a step which stores, in a restart page number memory unit, restart page number information corresponding to a page number for restarting the executed print process, when the print process being executed is interrupted in order to execute an interruption print process;

a step which, when restarting the interrupted print process after execution of the interruption print process, reads out the internal command and the image non-inclusion command stored in the first memory unit in the print process up to the page indicated by the restart page number information stored in the restart page number memory unit; and a step which, when executing the restarted printing process from the page indicated by the restart page number information, reads out the internal command and image non-inclusion data from the first memory unit, and furthermore reads out from the second memory unit the image data part in accordance with the internal command read out from the first memory unit.

BRIEF DESCRIPTION OF THE DRAWINGS

A more complete understanding of this application can be obtained when the following detailed description is considered in conjunction with the following drawings, in which:

FIG. 5 shows the data format of printing data;

FIGS. 9A and 9B are flowcharts showing processes executed by the interruption control unit;

FIGS. 13A and 13B are flowcharts showing processes executed by the PDL interpretation and execution unit.

DETAILED DESCRIPTION

Below, the preferred embodiments of the present invention are described with reference to the drawings.

Figure 2:
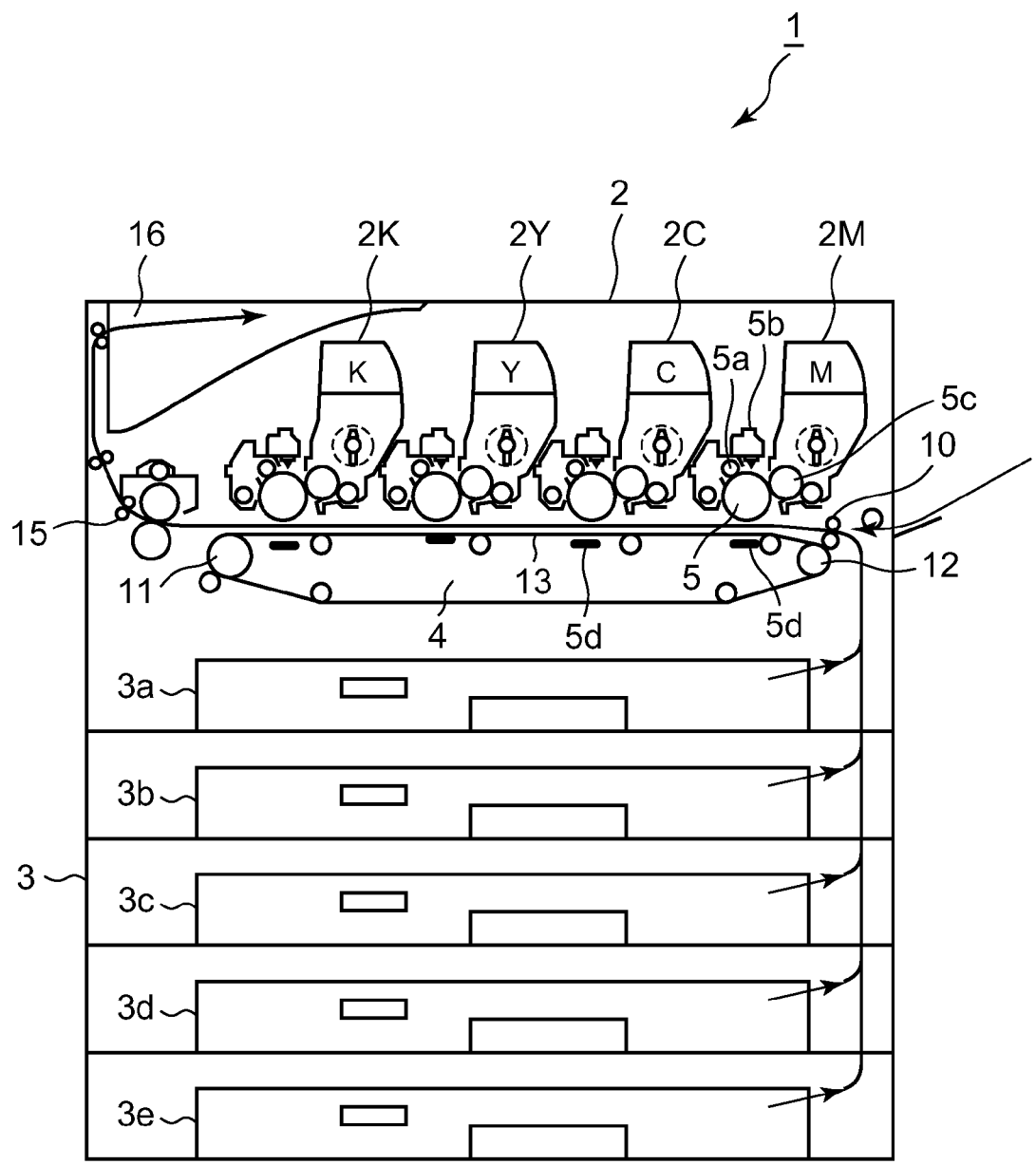
FIG. 2 is a summary cross-section of a printing device according to this embodiment.

FIG. 2 is a summary cross-section showing an example of a color printer (hereafter indicated as "printing device") of electronic photo format with for example four-head tandem composition as a printing device explaining the present embodiment.

As shown in FIG. 2, an engine part of a printing device 1 includes an image creation unit 2, recording medium paper supply unit 3 and a recording medium conveyor unit 4. The image creation unit 2 includes image creation units 2M, 2C, 2Y and 2K for magenta (M), cyan (C), yellow (Y) and black (K). Each of the image creation units 2M, 2C, 2Y and 2K are arranged in succession maintaining a predetermined spacing along the paper conveyor direction.

Each of the image creation units 2M, 2C, 2Y and 2K has a photosensitive drum 5, a charged body 5a positioned surrounding the photosensitive drum 5, a print head (LED head) 5b, a developer 5c and a transfer unit 5d, and create an image on paper in accordance with an electronic photography process. The electronic photography process repeats the various processes of charging, exposure, developing, transferring and cleaning, and is a process for creating an image on a paper (recording medium). Specifically, the electronic photography process applies a uniform electrical charge to the surface of the photosensitive drum 5 using electrification, creates an electrostatic latent image on the surface of the photosensitive drum 5 by exposure, creates a toner image in accordance with the electrostatic latent image through developing, transfers the toner image to paper through transfer and fuses the toner image transferred to the paper to the paper through a fusing process.

The recording medium paper supply unit 3 includes recording medium paper supply units 3a to 3e arranged in levels vertically. Paper supplied from any of the recording medium paper supply units 3a to 3e is sent to the recording medium conveyor unit 4 via a standby roller 10. The recording medium conveyor unit 4 includes a belt-driven roller 11, a following roller 12 and a conveyor belt 13. The conveyor belt 13 rotates as a result of drive power from the belt-driven roller and sends to the image creation unit 2 paper sent to the conveyor belt 13 with timing synchronized by the standby roller 10.

Corresponding toner is successively transferred by the above-described image creation units 2M, 2C, 2Y and 2K to the paper sent to the image creation unit 2. The toner image transferred to the paper is fused by the fuser 15. Following this, the paper is sent to a paper discharge unit 16.

The above-described units accomplish printing control that is optimum for the paper by setting a printer engine operating mode such as transfer speed (conveyor speed), transfer bias and fusing temperature on the basis of paper quality (for example, paper, OHP sheets, etc.), paper weight (for example, thin paper, regular paper, thick paper), paper length (for example, long paper) and the like.

Figure 3:
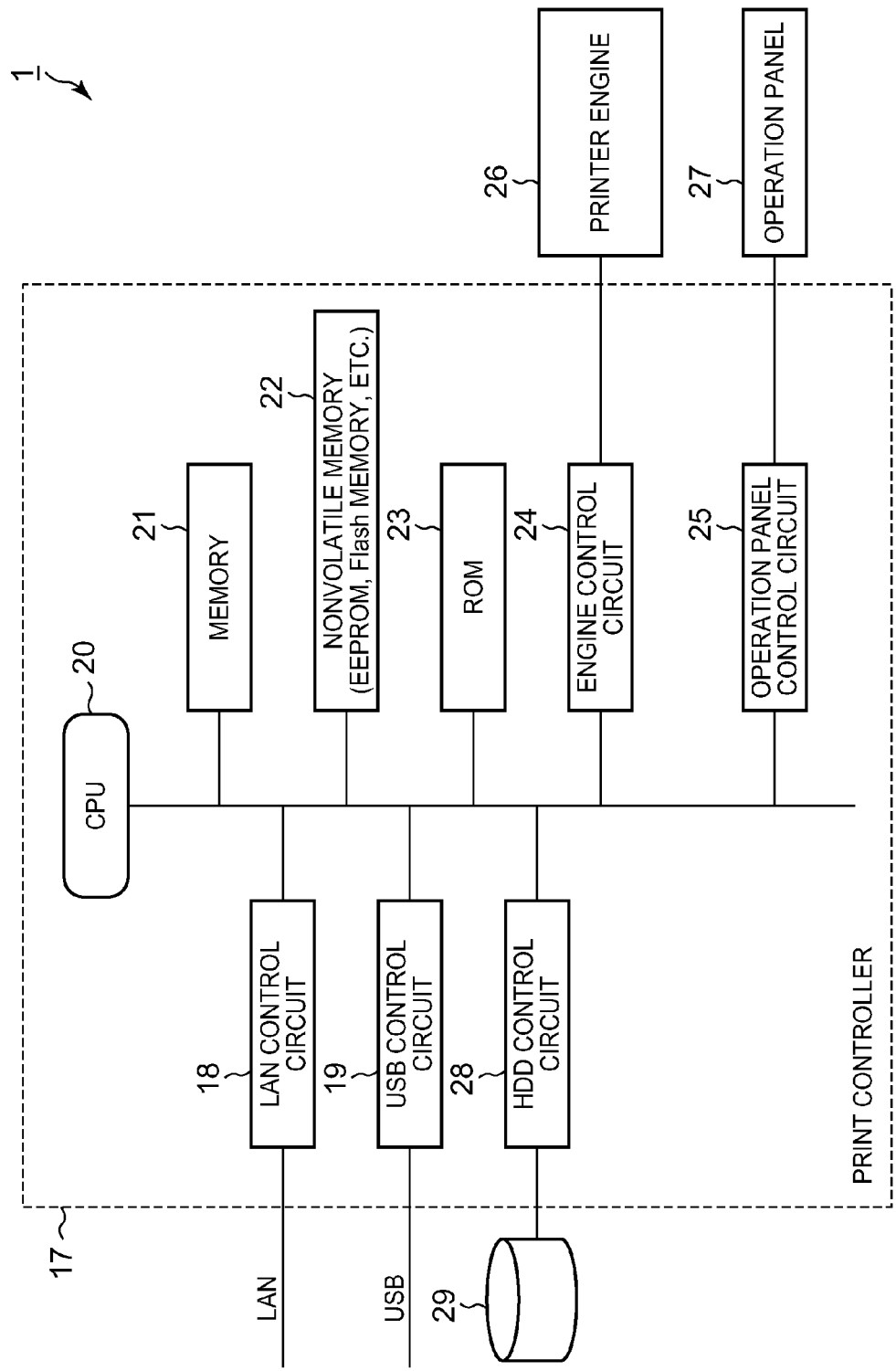
FIG. 3 shows the hardware composition for a printing control unit provided in a printing device according to this embodiment.

FIG. 3 shows the hardware composition for the printing control unit 17 in the printing device 1 having the above composition. The printing control unit 17 includes a LAN control circuit 18, a USB control circuit 19, a CPU 20, memory 21, nonvolatile memory 22, ROM 23, an engine control circuit 24, an operation panel control circuit 25 and a hard disk control circuit (hereafter indicated as the "HDD control circuit") 28.

In addition, a printer engine 26 is connected to the engine control circuit 24, an operation panel 27 is connected to the operation panel control circuit 25 and a hard disk 29 is connected to the HDD control circuit 28.

Figure 4:
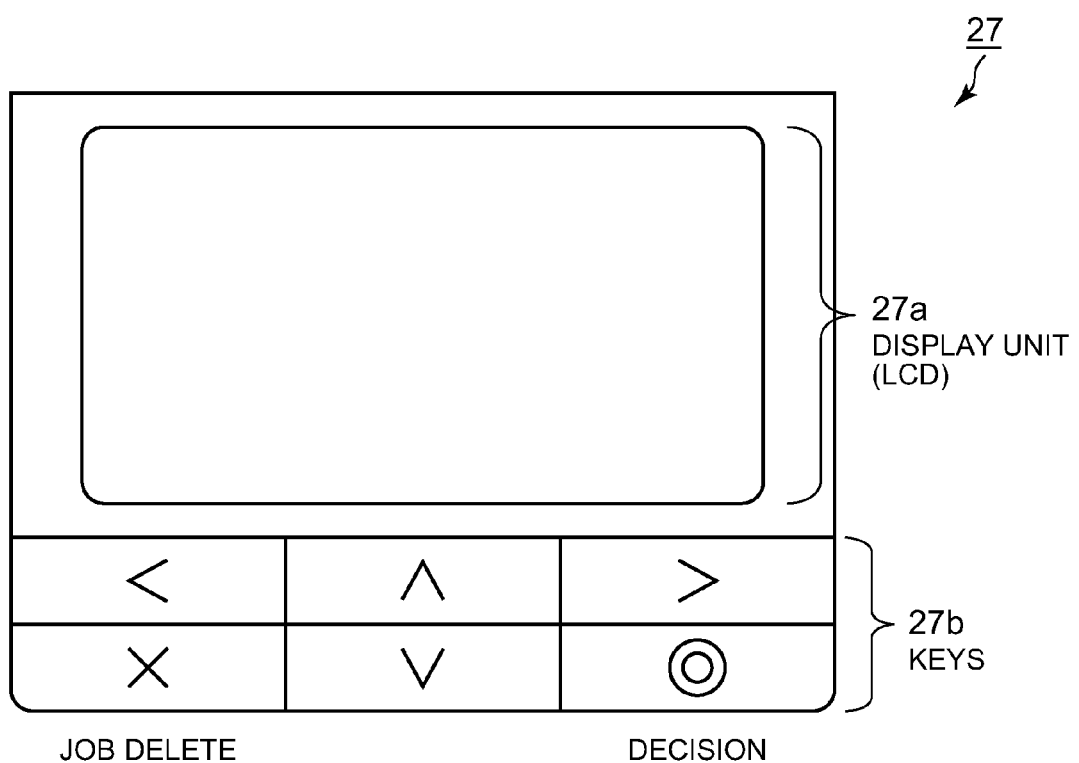
FIG. 4 shows the composition of an operation panel.

FIG. 4 shows the composition of the operation panel 27, and the operation panel includes a display unit 27a and a key unit 27b. On the display unit 27a, print job information for print execution underway or print execution standby read from a below-described input job queue is displayed. In addition, operation signals supplied from the key unit 27b on the basis of user operation are sent to the CPU 20 via the operation panel control circuit 25.

Figure 1:
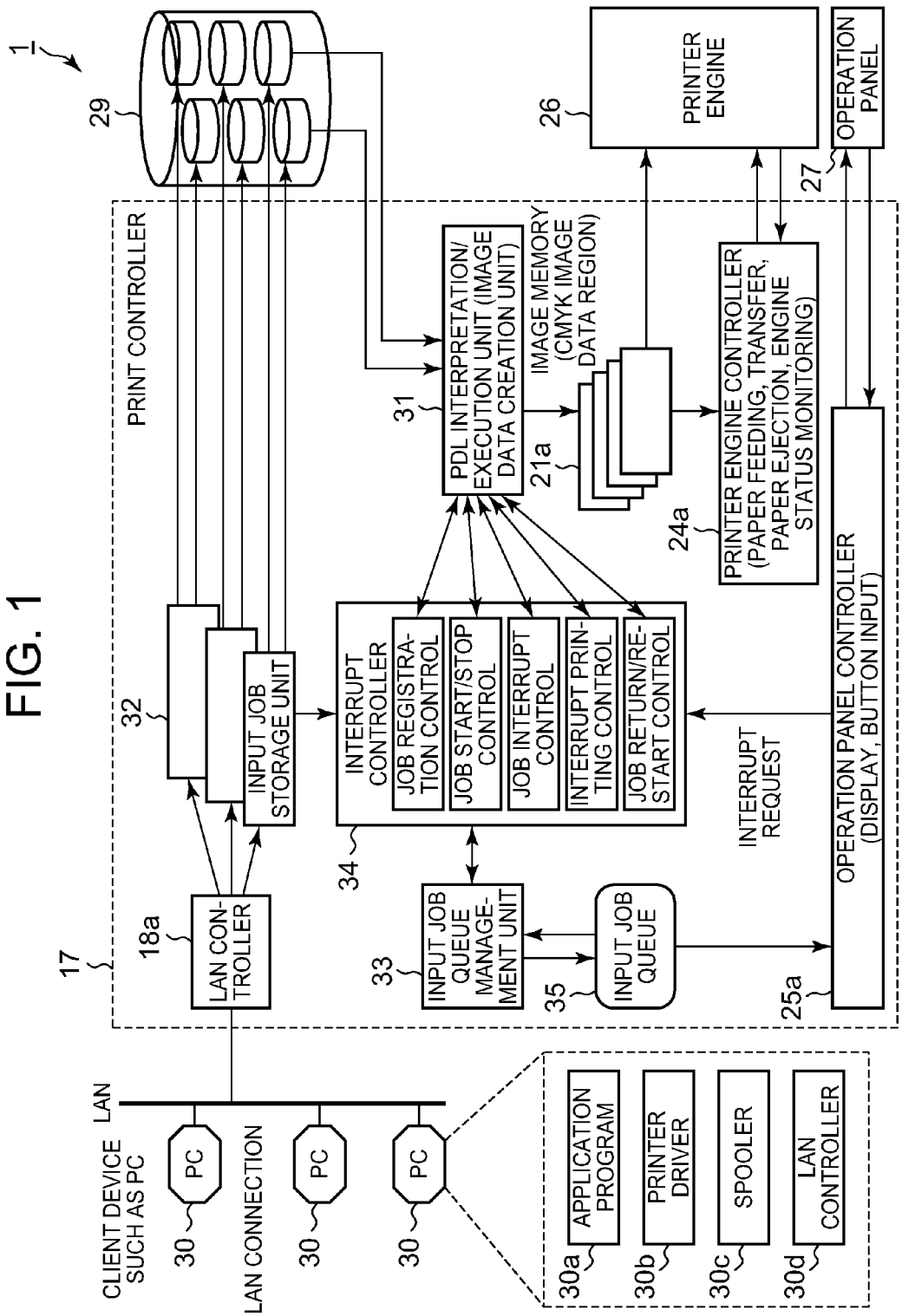
FIG. 1 shows the software composition for a printing control unit provided in a printing device according to this embodiment.

On the other hand, FIG. 1 shows the software composition of the above-described printing control unit 17, and functional units based on the circuits shown in above-described FIG. 3 are described using related numbers. The printing device 1 (printing control unit 17) of the present embodiment is connected to a client device (host equipment) 30 such as a personal computer (PC) or the like via a LAN (Local Area Network). The client device 30 includes for example an application program 30a, a printer driver 30b, a spooler 30c and a LAN connection control unit 30d.

The client device 30 converts print data created in accordance with the application program 30a into intermediate data including the above-described PDL command through the printer driver 30b, retains this in the spooler 30c and supplies this to the printing device 1 via the LAN connection control unit 30d.

The print data supplied from the client device 30 is supplied to the printing device 1 via the above-described LAN control circuit 18 (LAN control unit 18a).

As noted above, the printing device 1 is equipped with an engine control unit 24a corresponding to the engine control circuit 24, an operation panel control unit 25a corresponding to the operation panel control circuit 25 and an image memory 21a corresponding to the memory 21. The printing device 1 is further equipped with a PDL interpretation/execution unit that controls the CPU 20 through a program stored in the ROM 23, interprets the print data and executes printing; an input job storage unit 32 that executes an input job storage process; and an interruption control unit 34 that controls an interruption process.

In addition, the engine control unit 24a corresponding to the above-described engine control circuit 24 sets the printer engine operation mode and the like for the printer engine 26 and executes control of a paper supply process, a transfer process for image data supplied from the image memory 21a and a paper discharge process. In addition, the engine control unit 24a monitors the engine status intermittently for a set interval, acquires from each paper supply opening information indicating the paper supply opening status and monitors the status of each paper supply opening. Information that can be obtained from the paper supply openings is information indicating for example whether or not a cassette is installed, the set condition or withdrawn condition of the cassette, the presence or absence of paper, or paper size.

In addition, an input job queue 35 acting as a restart page number memory means is composed on the above-described nonvolatile memory 22 or the hard disk 29. The composition of the USB control circuit 19 shown in FIG. 3 is not particularly shown in FIG. 1.

FIG. 5 shows the data format of print data (print job) created by the printer driver 30 and supplied to the printing device 1. The print data includes an identifying flag & length description D1 in which the identifying flag and length are described, a data description area D2, an identifying flag & length description D3, a data description area D4, an identifying flag & length description D5, a data description area D6, and so forth.

Here, the identifying flags described in the identifying flag & length descriptions D1, D3, D5 and so forth are such that for example "0" indicates a PDL command other than an image drawing command is described in the next area, "1" indicates that an image drawing command (PDL command) is described in the next area, and "2" indicates that information on user name and print job name is described in the next area. In addition, length indicates the length of information described in the next area (D2, D4, D6 and so forth).

For example, in the example shown in FIG. 5, the identifying flag in the first identifying flag & length description D1 is "2", so the user name and print job name are described in the next data description area D2, and the identifying flag in the next identifying flag & length description D3 is "0", so a PDL command other than image drawing is described in the next data description area D4. This PDL command is a PDL command for example for information on paper size, information on paper supply openings or information on resolution and gradation settings.

In addition, the identifying flag in the next identifying flag & length description D5 is "1", so an image drawing command is described in the next data description area D6. This image drawing command is composed of an image data part and a control command part instructing to draw image data as-is on the printing device 1 side, including data already developed into image data that should be printed on the client device 30 side.

In the above composition, the process (action) of this example is as described below.

Figure 6A:
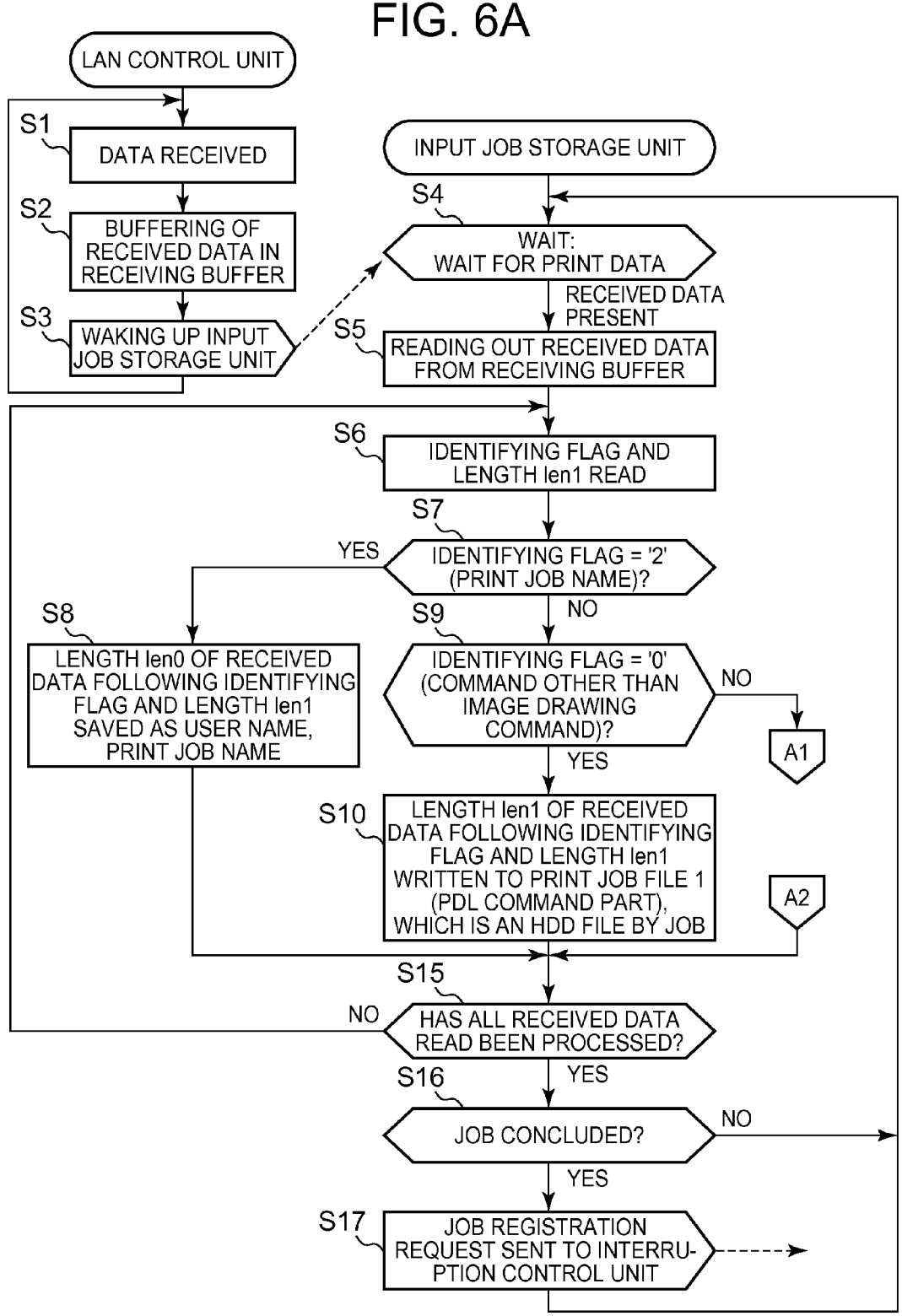
FIGS. 6A and 6B are flowcharts showing processes executed by the LAN control unit and input job storage unit.
Figure 6B:
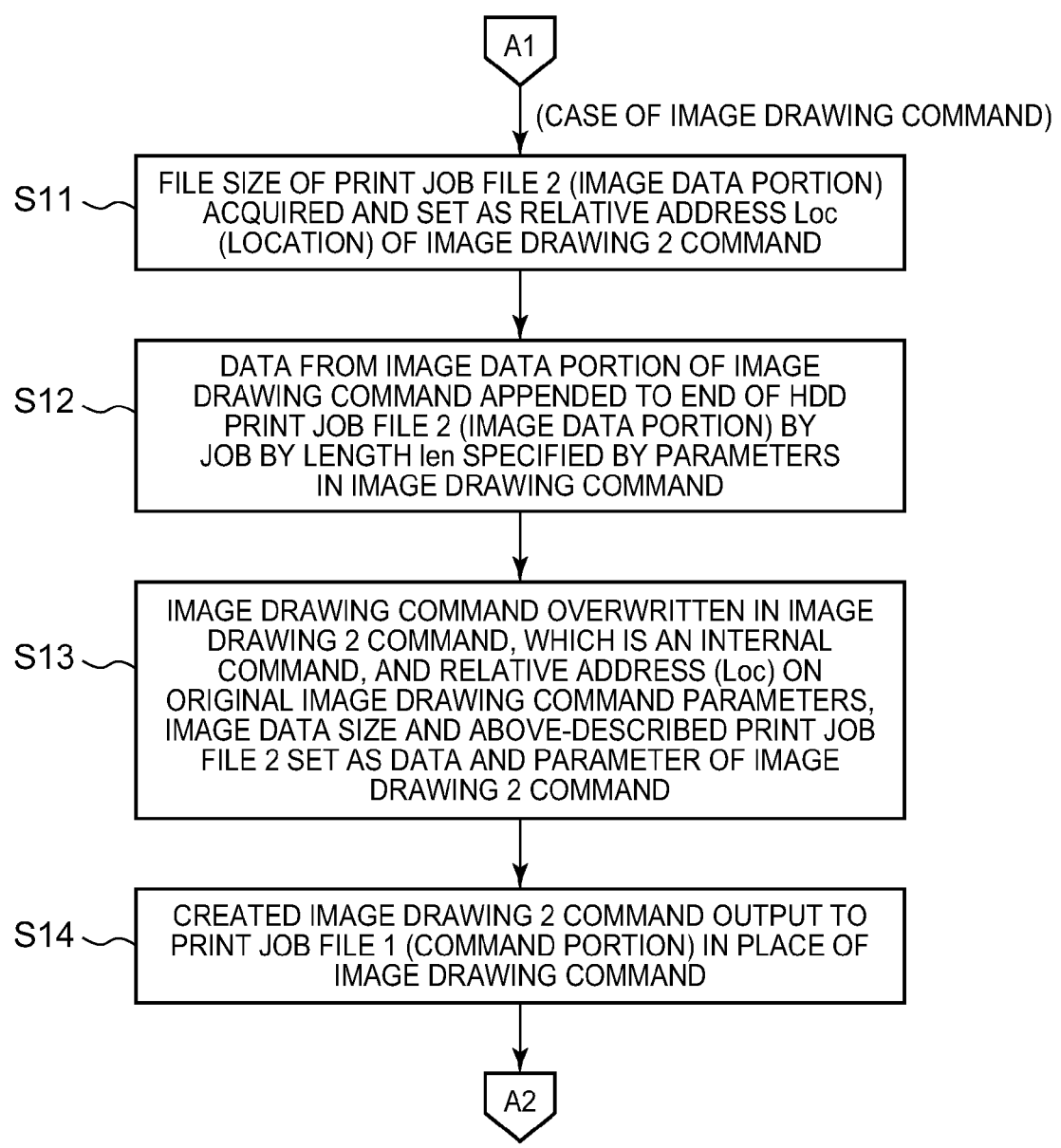

First, FIGS. 6A and 6B are flowcharts explaining the processes the LAN control unit 18a and the input job storage unit 32 execute, and explain processes executed when print data having the above-described format is input. First, the LAN control unit 18a, upon receiving the print data (step (hereafter indicated by "S") 1), buffers the print data in a receiving buffer (S2). The receiving buffer is set for example in a designated area of the above-described memory 21.

Next, the LAN control unit 18a notifies the input job storage unit 32 that print data has been supplied and wakes up the input job storage unit 32 (S3).

On the other hand, the input job storage unit 32 waits to receive print data (S4), and upon receiving notification from the LAN control unit 18a as noted above, begins a process and reads the print data (received data) stored in the receiving buffer (S5). Through this process, print data in the above-described format is read by the input job storage unit 32 and a command analysis process is executed.

Figure 7:
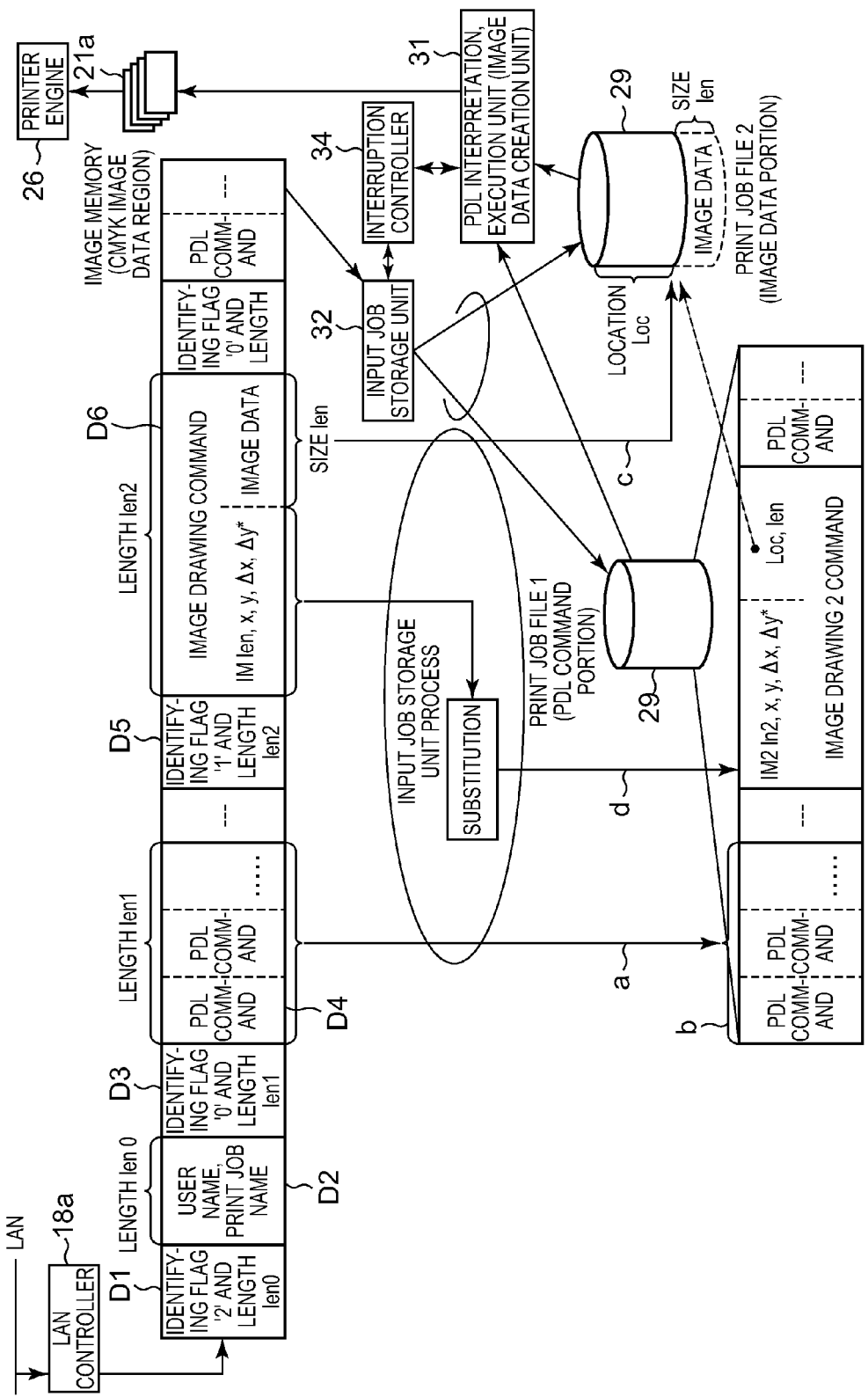
FIG. 7 is a summary view explaining the analysis process of the data format of printing data.

FIG. 7 is a summary drawing explaining this process. The print data shown in FIG. 7 is data corresponding to the data indicated in the above-described FIG. 5. In addition, FIG. 8 explains in detail processes for the identifying flag & length descriptions D3 and D5 and the data description areas D4 and D6.

First, the input job storage unit 32 reads the identifying flag and length information included in the first identifying flag & length description D1 of the print data (S6). Furthermore, the input job storage unit 32 determines whether or not the identifying flag is "2" (S7). In the example shown in FIG. 7, the identifying flag is "2" and the length is "len0". In this case, the input job storage unit 32 determines that the identifying flag is "2" (S7: Yes), and saves the user name and print job name information described in the data description area D2 following the identifying flag and length description D1 (S8).

On the other hand, when the input job storage unit 32 determines that the identifying flag is not "2" (S7: No), the determination is then made as to whether or not the identifying flag is "0" (S9). In the example shown in FIGS. 7 and 8, "0" is set as the identifying flag in the next identifying flag & length description D3. In this case, the input job storage unit 32 determines that the identifying flag is "0" (S9: Yes), and reads a PDL command other than an image drawing command from the data description area D4 following the identifying flat & length description D3 (S10). That is to say, the input job storage unit 32 reads the length "len1" of PDL command and writes this PDL command in print job file 1.

Figure 8:
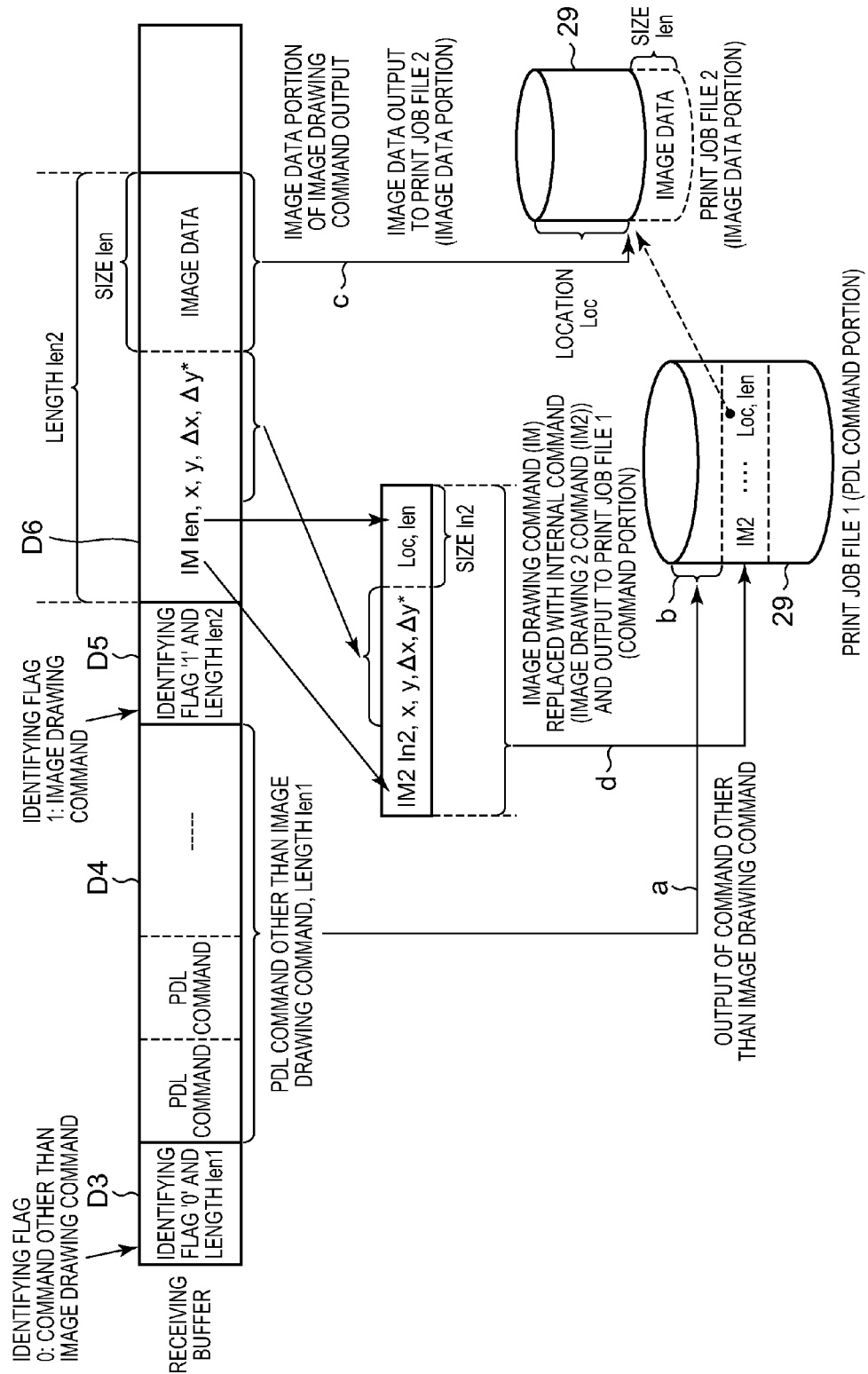
FIG. 8 shows in detail a process relating to the identifying flag and length description unit.

This process is the process "a" shown in FIGS. 7 and 8. In addition, the above-described print job file 1 is a file built on the above-described hard disk 29, and is a file that stores the above-described PDL command and a below-described image drawing 2 command (internal command).

Accordingly, the PDL command is first written in a prescribed area of the print job file 1 by the above process ("b" shown in FIGS. 7 and 8).

Next, the input job storage unit 32 reads the information of the identifying flag & length description D5 and determines the identifying flag. In the example shown in FIGS. 7 and 8, this identifying flag is "1". In this case, the input job storage unit 32 determines that the identifying flag is not "0" (S9: No), and reads the image drawing command of the data description area D6 following the identifying flag & length description D5 (S11-S14). In this case, the input job storage unit 32 appends the image data part of the image drawing command to the end of the print job file 2, replaces the command parameter part in the image drawing 2 command and writes to the print job file 1.

The input job storage unit 32 first acquires the file size of the print job file 2 and sets the relative address Loc (location) of the image drawing 2 command (S11).

This print job file 2 is also a file built on the hard disk 29, and is a file that stores the image data part of the image drawing command. That is to say, because the image data is appended to the end of the print job file 2, the file size of the print job file 2 prior to the appending is the relative address Loc on the print job file 2 of this image data.

Next, the input job storage unit 32 stores at the end of the print job file 2 the image data part of the image drawing command, to a length designated by the parameter of the image drawing command (S12). That is to say, the input job storage unit 32 appends image data from the position of the relative address Loc of the print job file 2, as shown in FIGS. 7 and 8.

Next, the input job storage unit 32 replaces the image drawing command in the image drawing 2 command that is an internal command, and makes the parameter of the original image drawing command, and the image data size and the relative address Loc of the above-described print job file 2 the parameter and data of the image drawing 2 command (S13). That is to say, the input job storage unit 32, as shown by process "d" in FIGS. 7 and 8, stores "IM2 ln2 x, y, $\Delta$x, $\Delta$y*", which are the parameters of the original image drawing command, along with the len, which is the image data size, and the relative address Loc as data of the image drawing 2 command.

Next, the input job storage unit 32 outputs the created image drawing 2 command to the print job file 1 in place of the image drawing command (S14).

When the process of S8, S10 or S14 ends, the input job storage unit 32 determines whether or not all print data read from the receiving buffer has been processed (S15). When the input job storage unit 32 determines that all processes have not been completed (S15: No), the above processes are repeated until all read print data is processed (S6-S15). On the other hand, when the input job storage unit 32 determines that all processes have been completed (S15: Yes), the determination is made as to whether or not the print job has ended (S16).

When the input job storage unit 32 determines that one print job has ended (S16: Yes), a job registration request is output to the interruption control unit 34 (S17). At that time, the input job storage unit 32 transfers to the interruption control unit 34 the user name, print job name, the name of job file 1 (hereafter "job file 1 name") and the name of job file 2 (hereafter "job file 2 name") that have been saved. The print job file 1 name and print job file 2 name are unique names automatically created by the input job storage unit 32. When it is determined that one print job has not ended (S16: No), or when the process of S17 has ended, the input job storage unit 32 returns to the process in S4.

Figure 9B:
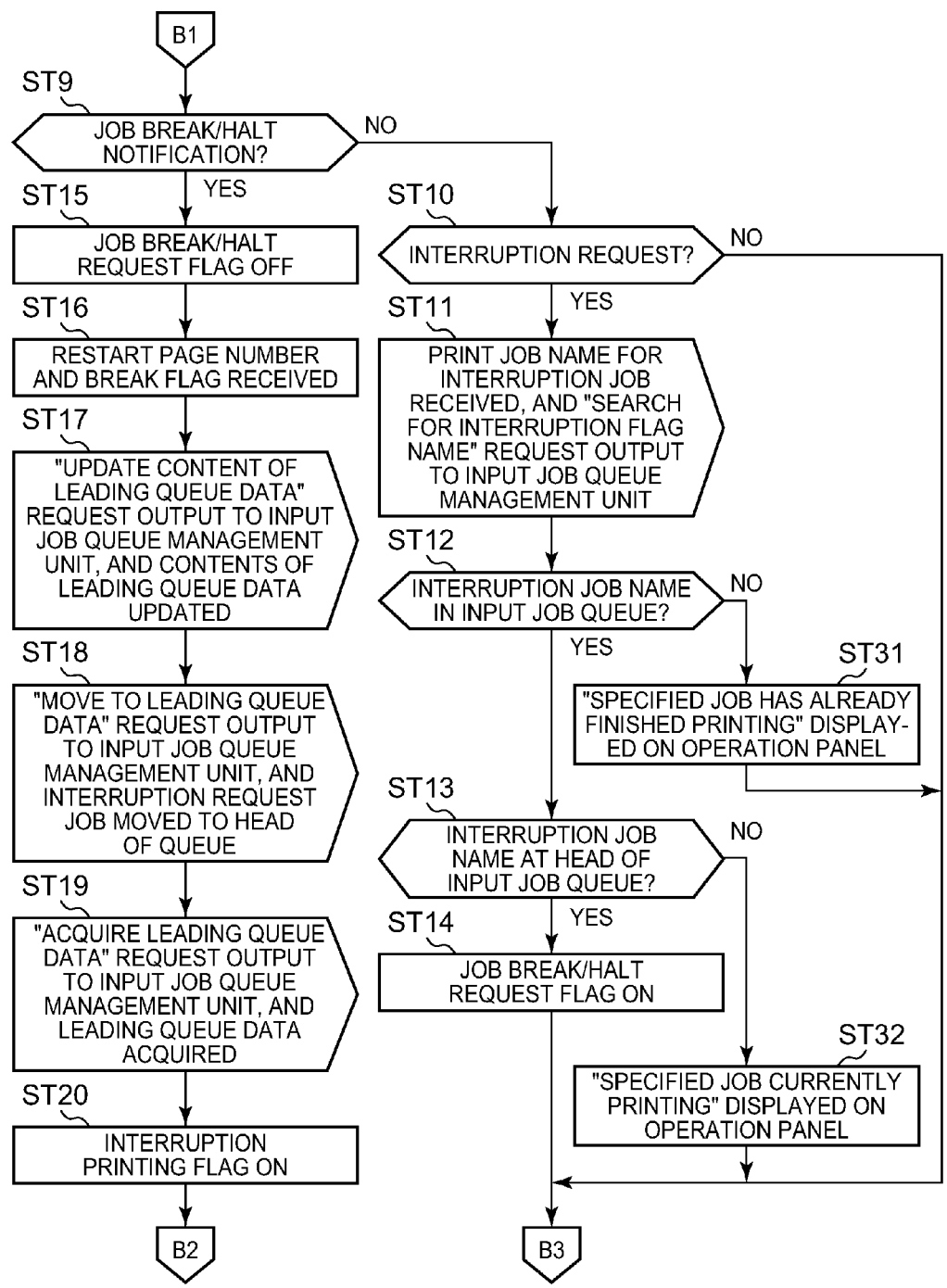

FIGS. 9A and 9B are flowcharts explaining the processes executed by the interruption control unit 34. First, the interruption control unit 34 waits in a request wait state (step (hereafter indicated by "ST") 1). When there is a request, the interruption control unit 34 determines whether or not the request is a job registration request made from the above-described input job storage unit 32 (ST2). When the interruption control unit 34 determines that the request is a job registration request (ST2: Yes), information on the above-described print job name, print job file 1 name and print job file 2 name is received (ST3). Furthermore, the interruption control unit 34 outputs a request to "register to the end of the queue" to the input job queue management unit 33 (ST4). At this time, the interruption control unit 34 transfers to the input job queue management unit 33 the information on the print job name, print job file 1 name and print job file 2 name received from the above-described input job storage unit 32.

Figure 10A:
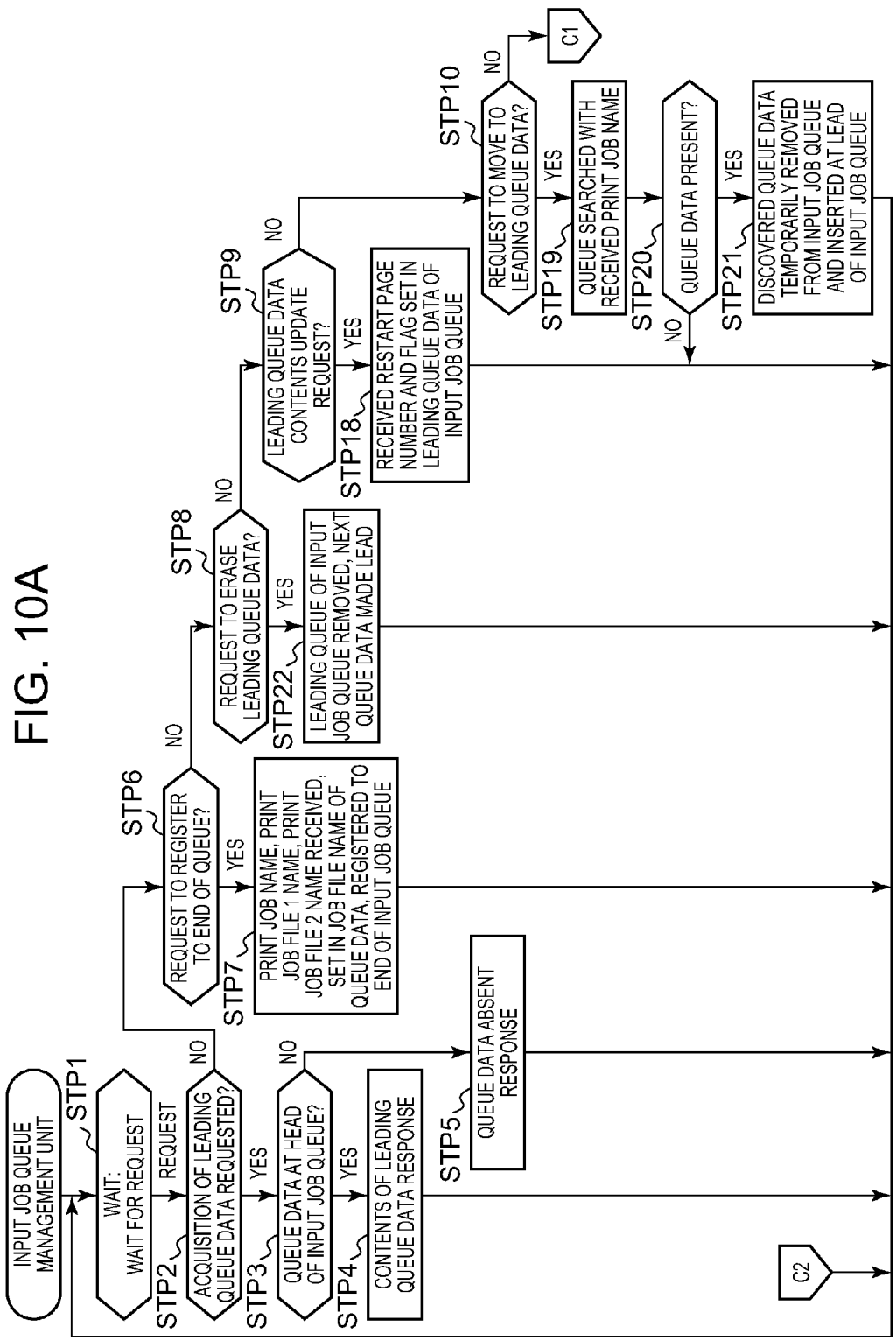
FIGS. 10A and 10B are flowcharts showing a process executed by the input job queue management unit.
Figure 10B:
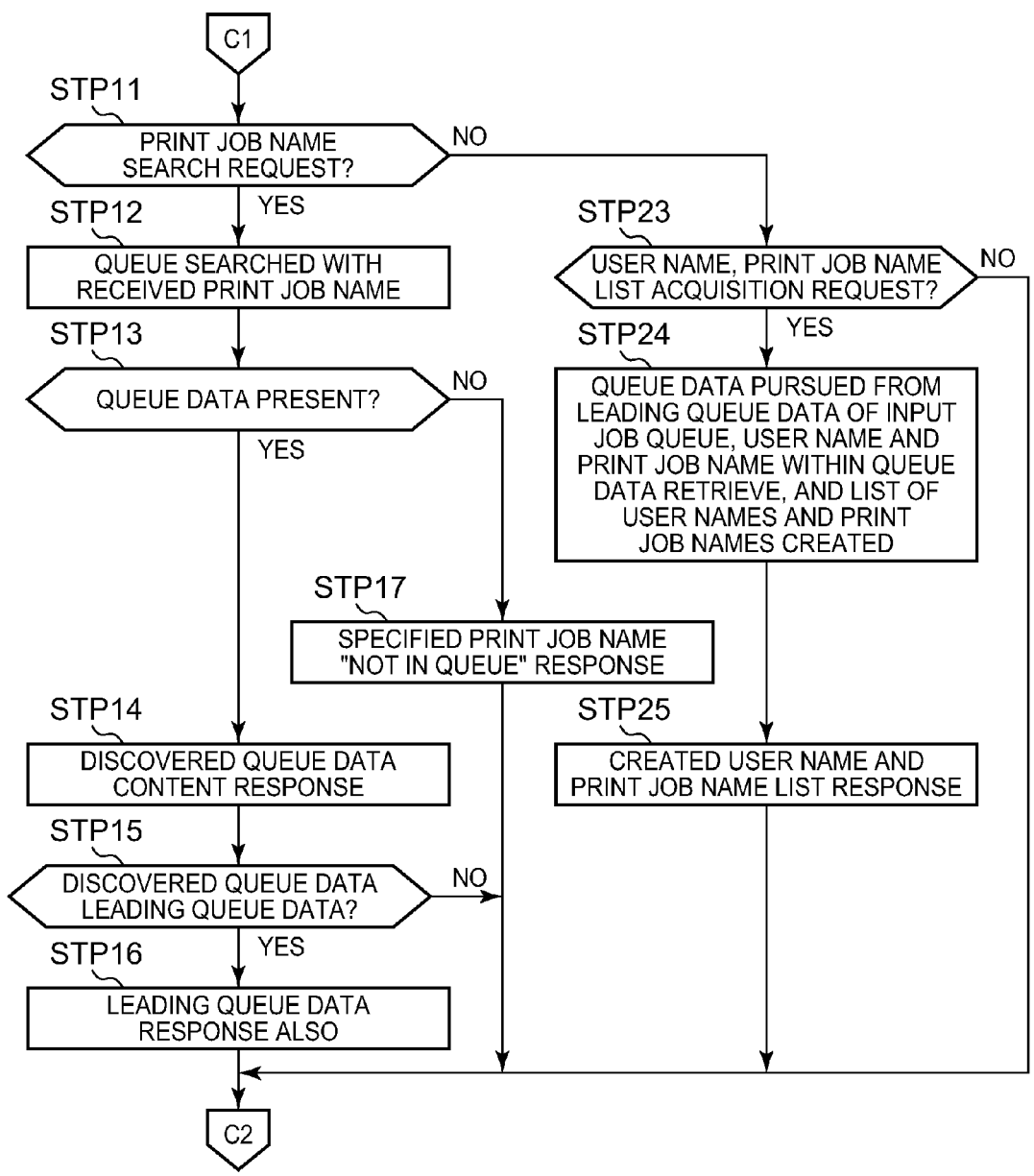

FIGS. 10A and 10B are flowcharts explaining the processes executed by the input job queue management unit 33. The input job queue management unit 33 waits in a request wait state (step (hereafter indicated by "STP") 1). When there is a request, the input job queue management unit 33 determines whether or not the above-described request is a lead queue data acquisition request from the above-described interruption control unit 34 (STP2). When the input job queue management unit 33 determines that the above-described request is not a lead queue data acquisition request (STP2: No), a determination is made as to whether or not the above-described request is a request for "registering to the end of the queue" from the above-described interruption control unit 34 (STP6). When the input job queue management unit 33 determines that the above-described request is a request for "registering to the end of the queue" (STP6: Yes), the print job name, print job file 1 name and print job file 2 name are received, new queue data is created, information on the received print job name and the like is set in the queue data and that queue data is registered to the end of the input job queue (STP7).

When the process of ST4 is concluded, the interruption control unit 34 outputs a "lead queue data acquisition" request to the input job queue management unit 33 (ST5), and determines whether or not information about the above-described print job name and the like has been registered to the head of the input job queue 35 (ST6). This determination is made through responses from the input job queue management unit 33, and is based on the processes of the input job queue management unit 33 shown in FIGS. 10A and 10B.

That is to say, when the input job queue management unit 33 determines that the above-described request is a lead queue data acquisition request from the above-described interruption control unit 34 (STP2: Yes), a determination (confirmation) is made as to whether or not there is queue data at the head of the input job queue 35 (STP3). Here, when the input job queue management unit 33 has determined that there is queue data at the head of the input job queue 35 (STP3: Yes), the contents of the queue data at the head of the input job queue 35 are sent as a response to the interruption control unit 34 (STP4). On the other hand, when the input job queue management unit 33 has determined that queue data is not at the head of the input job queue 35 (STP3: No), the fact that queue data is not at the head of the input job queue 35 is sent as a response to the interruption control unit 34 (STP5).

On the other hand, the interruption control unit 34 determines whether or not queue data registered to the end of the input job queue 35 in the registration request of ST4 has been registered to the head of the input job queue 35 (ST6). Specifically, the interruption control unit 34 determines whether or not the contents of the queue data at the head of the input job queue 35 responded to with the above response is content indicating the print job registered this time by the print job output by that registration request. When the interruption control unit 34 has determined that the content of the queue data at the head of the input job queue 35 is content indicating the print job registered this time by the print job output by that registration request (ST6: Yes), an instruction to execute the print job is given to the PDL interpretation/execution unit 31 in order to execute the print job output by that registration request (ST7). At this time, the interruption control unit 34 transfers information about the print job name, the print job file 1 name and the print job file 2 name to the PDL interpretation/execution unit 31. When the determination is "Yes" in ST6, this means that information about the above-described print job name, print job file 1 name and print job file 2 name has been registered to the head of the input job queue 35 by the registration request of ST4, and means that there is no print job currently printing.

When it is determined that the content of the queue data at the head of the input job queue 35 is not content indicating the print job registered this time by the print job output by that registration request (ST6: No), the interruption control unit 34 returns to the process of ST1 without executing the process of ST7. When the determination is "No" in ST6, this means that another print job is currently printing, and means that information on a new print job was registered to the end of the input job queue 35.

Figure 11:
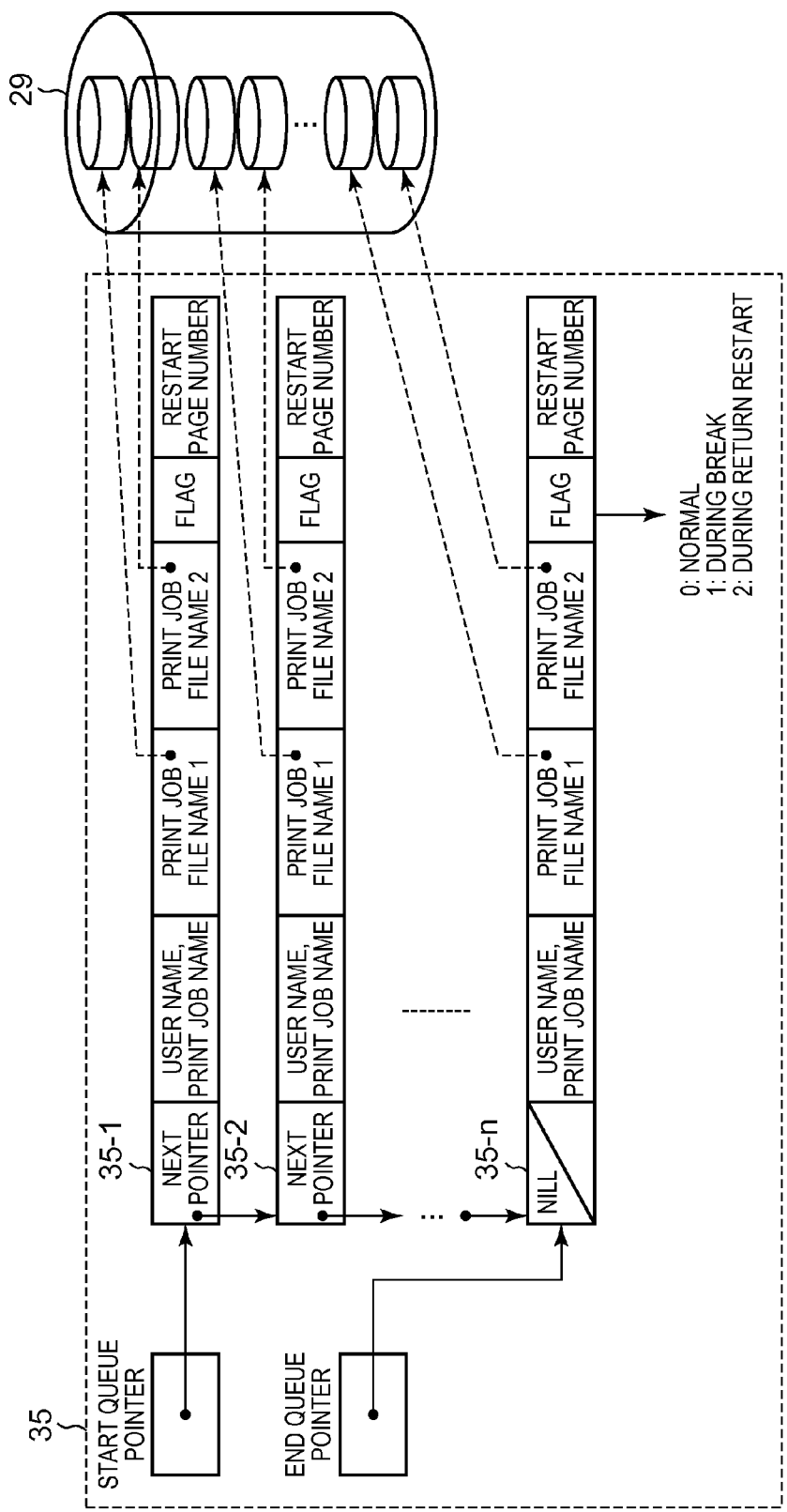
FIG. 11 shows the composition of data in the input job queue.

FIG. 11 shows the composition of data in the input job queue 35. As shown in FIG. 11, the start queue pointer links to the first print job information 35-1, the next pointer of the first print job information 35-1 indicates the next print job information 35-2, and the next print job information 35-n is indicated in accordance with the designation of successive next pointers after that. In each print job information 35-1 to 35-n, the above-described user name, print job name, print job file 1 name and print job file 2 name are recorded.

In addition, when the below-described interruption process is accomplished, a flag indicating interruption is set in the flag area of the lead print job information 35-1, and restart page information indicating the first page whose printing process was interrupted by the interruption process is recorded in the restart page number area.

Figure 12:
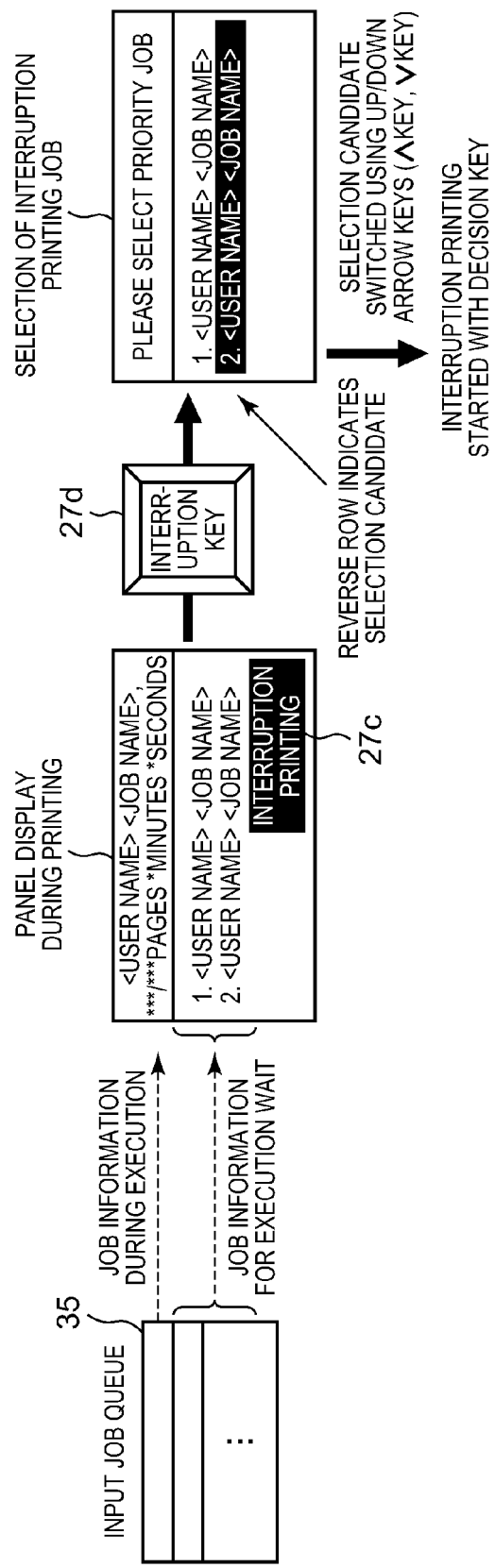
FIG. 12 shows a display panel display example.

In addition, the print job information registered in the above-described input job queue 35 is displayed on the operation panel 27 under control by the operation panel control unit 25a. FIG. 12 shows an example of the print job information recorded in the input job queue 35 displayed on the operation panel 27. As shown in FIG. 12, the print job name and user name of the job being printed and the print job name and user name of the job in print execution standby are displayed on the operation panel 27. In addition, in the case of states in which interruption printing is possible, an "interruption printing" mark 27c indicating the possibility of interruption printing is displayed on the operation panel 27.

The above-described display is executed by the process of the input job queue management unit 33 shown in FIGS. 10A and 10B, for example. In other words, the interruption control unit 34, after determining No in STP2, No in STP6, No in STP8, No in STP9, No in STP10 and No in STP11, in the determination of whether or not the above-described request is a list acquisition request for the user name and print job name (ST23), when the above-described request is determined to be a list acquisition request for the user name and print job name (STP23: Yes), follows queue data from the queue data at the head of the input job queue 35, reads out the user name and print job name in the input job queue 35, and creates a list (STP24). Furthermore, the input job queue management unit 33 makes a response to the above-described list (STP25) and for example controls the operation panel 27 to make the above-described display.

On the other hand, when an interruption key 27a (substituted by the right arrow key (>) shown in FIG. 4) is pressed in the display state shown in the above-described FIG. 12, the display of the print job name and user name on print standby is reversed, as shown in FIG. 12, and it is possible to select the print job to accomplish interruption printing by the up and down arrow keys (∧,∨) shown in the above-described FIG. 4 being pressed. In addition, determination of the selected print job can be made by the decision key in the key unit 27b shown in the above-described FIG. 4 being pressed.

When interruption printing is indicated by the above-described operation, an operation signal supplied form the operation panel 27 is sent as an interruption request to the interruption control unit 34 under the control of the operation panel control unit 25a. At this time, after determining No in ST2, No in ST8 and No in ST9, the interruption control unit 34 determines whether or not the above-described request is the above-described interruption request (ST10). When the interruption control unit 34 determines that the above-described request is the above-described interruption request (ST10: Yes), information on the print job name for which interruption processing will be accomplished is received and an "interruption job name search" request is output to the input job queue management unit 33 (ST11). The interruption job name is the print job name of the print job for which designation of interruption printing has been accomplished.

After determining No in STP2, No in STP6 and No in STP8 to STP10, the input job queue management unit 33 makes a determination as to whether or not there is a print job name search request from the above-described interruption control unit 34 (STP11), and when the determination is that the above-described request is a print job name search request from the above-described interruption control unit 34 (STP11: Yes), the input job queue 35 is searched with the print job name transferred from the interruption control unit 34 (STP12), and a determination is made as to whether or not there is queue data (whether or not the print job name received from the interruption control unit 34 exists in the input job queue 35) (STP13). When it is determined that there is queue data (STP13: Yes), the input job queue management unit 33 responds to the interruption control unit 34 with the contents of the found queue data (STP14). Furthermore, the input job queue management unit 33 determines whether or not the found queue data is the lead queue data (STP15), and when it is determined that the found queue data is the lead queue data (STP15: Yes), a response is also made to the effect that the found queue data is the lead queue data (STP16). On the other hand, when it is determined that the found queue data is not the lead queue data (STP15: No), the input job queue management unit 33 returns to the process in STP1.

When the input job queue management unit 33 determines that queue data does not exist (STP13: No), a response of "queue data nonexistent" is made to the interruption control unit 34 (STP17).

Accordingly, through the above-described responses the interruption control unit 34 can determine whether or not the interruption job name exists in the input job queue 35 (ST12). When it is determined that the interruption job name does not exist in the input job queue 35 (ST12: No), the interruption control unit 34 displays "designated job has already finished printing" on the operation panel (ST31). When it is determined that the interruption job name exists in the input job queue 35 (ST12: Yes), the interruption control unit 34 determines whether or not this interruption job name is at the head of the input job queue 35 (ST13). This determination is also possible through responses from the above-described input job queue management unit 33, and when it is determined that this interruption job name is at the head of the input job queue 35 (ST13: Yes), the interruption control unit 34 displays "designated job is currently printing" on the operation panel because this job is currently printing, and because there is no particular need to accomplish an interruption process, the current printing continues without change (ST32).

On the other hand, when it is determined that this interruption job name is not at the head of the input job queue 35 (ST13: No), the interruption control unit 34 turns the job interruption/halt request flag on (ST14) and accomplishes the printing process interruption process during printing.

Through the above-described job interruption/halt request flag being turned on, the print job process being executed by the printing device 1 is halted. This process is executed during execution of the process of the PDL interruption/execution unit 31 shown in below-described FIGS. 13A and 13B by the PDL interpretation/execution unit 31 determining that the above-described interruption/halt request flag is on (step (hereafter indicated by "W") 21), and the internal state of the PDL interpretation/execution unit 31 being initialized and a job interruption process being accomplished (W24). In addition, the PDL interpretation/execution unit 31 notifies the interruption control unit 34 that the process has been interrupted and halted, and the value on the page counter is passed to the interruption control unit 34 as the restart page number (W25).

When it is determined that notification has been given from the PDL interpretation/execution unit 31 that the job has been interrupted and halted (ST9: Yes), the interruption control unit 34 turns the job interruption/halt request flag off (ST15) and receives information on the restart page number and a flag indicating that interruption is underway (ST16). This restart page number can be the number of the last page out of the pages already printed, or can be the number of the first page out of the pages still unprinted.

Next, the interruption control unit 34 outputs a "lead queue data content update" request to the input job queue management unit 33 (ST17). At this time, the interruption control unit 34 receives information on the above-described restart page number and a flag indicating interruption is underway. When this indication is given, when the input job queue management unit 33 determines that there is a lead queue data content update request (STP9: Yes), the received information on restart page number and flag indicating interruption is underway are set in the queue data at the head of the input job queue 35 (STP18). For example, through this process, information on the above-described restart page number and the flag indicating interruption is underway are set in the first print job information 35-1 shown in above-described FIG. 11.

Next, the interruption control unit 34 outputs a "move to lead queue data" request to the input job queue management unit 33 (ST18). At this time, the interruption control unit 34 passes information on the print job name of the interruption request to the input job queue management unit 33. When this instruction is present, the input job queue management unit 33 determines that there is a move to lead queue data request (STP10: Yes), searches within the input job queue 35 based on the received print job name (STP19) and determines whether or not there is queue data with the above-described print job name (STP20). When it is determined that there is queue data with the above-described print job name (STP20: Yes), the input job queue management unit 33 temporarily detaches the found queue data from the input job queue 35 and inserts such at the head of the input job queue 35 (STP21). Through this process, the print job information 35-*n* shown in the above-described FIG. 11 is inserted at the head of the input job queue 35.

Next, the interruption control unit 34 outputs a "lead queue data acquisition" request to the input job queue management unit 33 (ST19). Furthermore, the interruption control unit 34 turns the interruption printing flag on (ST20) and orders interruption printing through the above-described process (ST7).

Figure 13B:
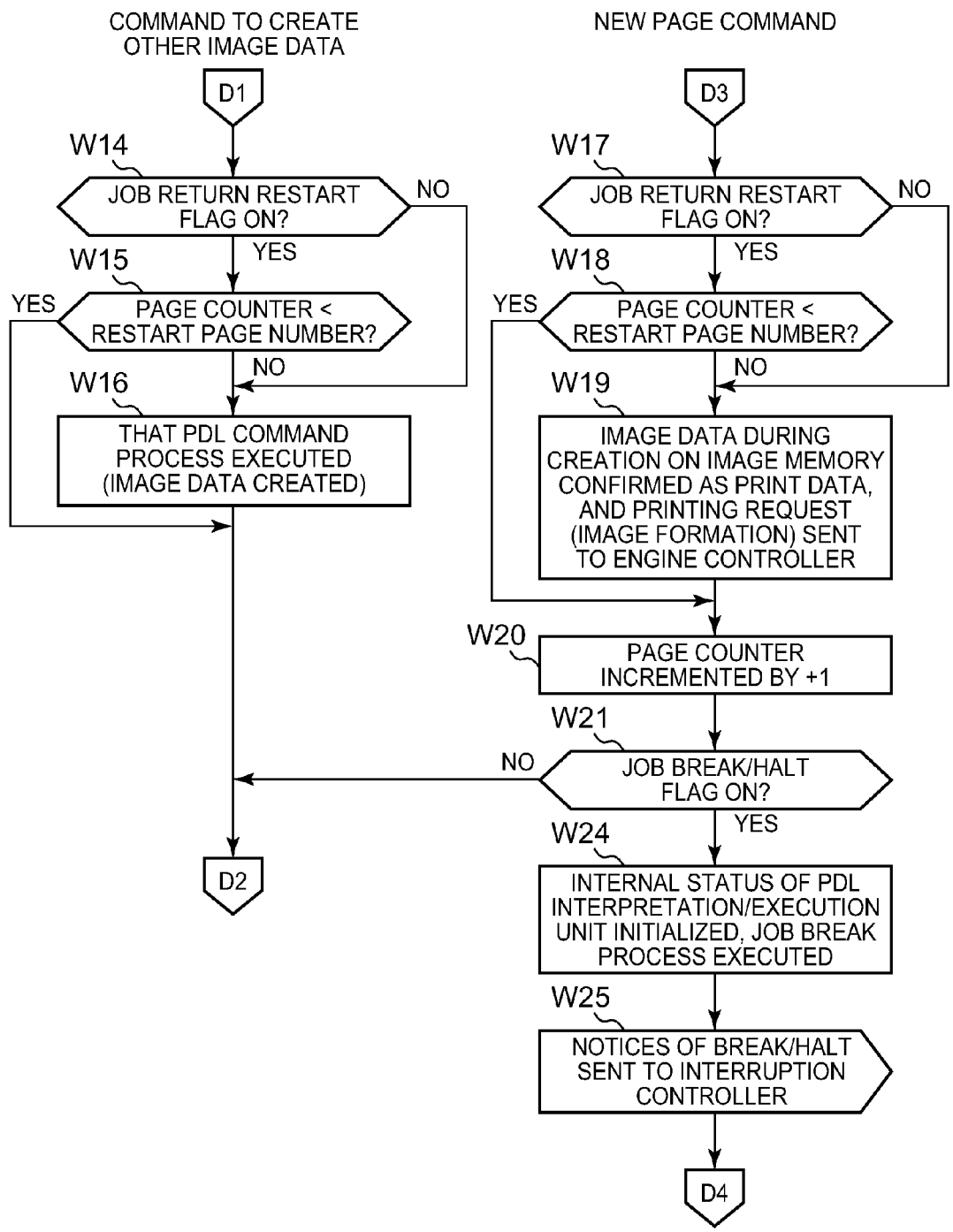

FIGS. 13A and 13B are flowcharts explaining the process executed by the PDL interpretation/execution unit 31. The PDL interpretation/execution unit 31 waits in a request wait state (W1) and determines whether or not there is a print job execution order (W2). When it is determined that there is a print job execution order (W2: Yes), the PDL interpretation/execution unit 31 sets the page counter to 0, in other words initializes this (W3) and receives information about the print job file 1 name and print job file 2 name for which the print process is to be executed (W4).

Next, the PDL interpretation/execution unit 31 first reads information on the print job file 1 (W5) and determines whether or not there is read out data (W6). When the determination is that there is read out data in the print job file 1 in this first determination (W6: Yes), the PDL interpretation/execution unit 31 accomplishes analysis of the PDL command stored in the print job file 1 (W7). As described above, PDL commands such as paper supply opening information, resolution and gradation information and like necessary when accomplishing the print process are included in the print job file 1, so the PDL interpretation/execution unit 31 executes the command process without change (W8).

In addition, when the PDL command is the image drawing 2 command, the PDL interpretation/execution unit 31 determines whether or not a job reinstatement/restarting flag is on (the below-described flag indicating restarting is set) (W9), and when the determination is that the job reinstatement/restarting flag is on (W9: Yes), the restart page number and the page counter are compared (W10). When it is determined that interruption printing is currently being accomplished, in other words that the job reinstatement/restarting flag is not on (W9: No), the PDL interpretation/execution unit 31 reads information about the relative address Loc and the length len of the image drawing 2 command (W11) and reads the above-described length len of data from the position of the relative address Loc of the print job file 2 (W12). This data is the image data part stored in the print job file 2 on the hard disk 29 by the above-described process, and the PDL interpretation/execution unit 31 reads the information on this image data part and creates image data on the basis of the read image data (W13).

In addition, when the PDL command is a command to create other image data, the PDL interpretation/execution unit 31 similarly determines whether or not the job reinstatement/restarting flag is on (W14) and when the determination is that the job reinstatement/restarting flag is on (W14: Yes), compares the restart page number and the page counter (W15). When it is determined that interruption printing is currently underway, that is to say, that the job reinstatement/restarting flag is not on (W14: No), the PDL interpretation/execution unit 31 accomplishes the corresponding PDL command without executing the determination process of W15 (W16). Furthermore, when the PDL command is an update page command, the PDL interpretation/execution unit 31 similarly determines whether or not the job reinstatement/restarting flag is on (W17), and when it is determined that the job reinstatement/restarting flag is on (W17:Yes), compares the restart page number and the page counter (W18). When it is determined that interruption printing is currently underway, that is to say that the job reinstatement/restarting flag is not on (W17: No), the PDL interpretation/execution unit 31 executes the process in W19 without executing the determination process in W18, and increments the page counter by +1 (W20).

The above-described process of W19 is a process that confirms the image data being created in the image memory 21*a* as the print data, instructs the engine control unit 24*a* to do the print process, and at the same time receives the above-described information about the paper-supply opening and information on the resolution and gradation as parameters. The engine control unit 24*a* drives the printer engine 26 in accordance with this command and process and accomplishes printing output of the print job for which there was an interruption instruction.

In addition, the PDL interpretation/execution unit 31 determines whether or not the job interruption/halt flag is on (W21). In this case, when it is determined that the job interruption/halt flag is not on (W21: No), the PDL interpretation/execution unit 31 determines that not all read data has been interpreted (W22: No) and repeats the above-described processes (W7-W22).

Following this, when it is determined that all read data has been interpreted (W22: Yes) and that there is no read data (W6: No), the PDL interpretation/execution unit 31 sends notification of the end of the print job to the interruption control unit 34 (W23).

When it is determined that a print job end notification has been received from the PDL interpretation/execution unit 31 (ST8: Yes), the interruption control unit 34 deletes the print job file 1 and the print job file 2 of the concluded print job (ST21), and in addition turns the job reinstatement/restarting flag off and turns the interruption printing flag off (ST22). Furthermore, the interruption control unit 34 outputs a "lead queue data delete" request to the input job queue management unit 33 (ST23). Following this instruction, the input job queue management unit 33 determines that there is a lead queue data deletion request (STP8: Yes), detaches the lead queue data of the input job queue and moves the next queue data to the head (STP22).

In addition, the interruption control unit 34 outputs the "lead queue data acquisition" request to the input job queue management unit 33 (ST24). Following this instruction, the input job queue management unit 33 responds to whether or not there is lead queue data in the input job queue, similar to what was described above (STP2-STP4). On the other hand, when it is determined that there is lead queue data in the input job queue 35 based on the above-described response results (ST25: Yes), the interruption control unit 34 further determines whether or not the flag indicating interruption of lead queue data is on (ST26).

When it is determined that the flag indicating interruption of the lead queue data is on (ST26: Yes), the interruption control unit 34 turns the job reinstatement/restart flag on and sets the restart page number information in the shared memory (ST27). That is to say, in this case the queue data positioned at the head of the input job queue 35 is a print job interrupted by interruption printing. The restart page number information is stored in this print job information, and this information is stored in the shared memory.

Following this, the interruption control unit 34 instructs the PDL interpretation/execution unit 31 to execute the print job (ST7). At this time, the interruption control unit 34 passes to the PDL interpretation/execution unit 31 information on the print job name, the print job file 1 name and the print job file 2 name, the same as described above.

Following this, the PDL interpretation/execution unit 31 first reads information on the job file 1 the same as described above (W5) and analyzes the PDL command stored in the job file 1 (W6, W7). As described above, PDL commands such as information on the paper-supply opening and information on the resolution and gradation necessary when accomplishing the print process are included in the print job file 1, so the PDL interpretation/execution unit 31 accomplishes command processing without change (W8).

On the other hand, in the case of an image drawing 2 command, the PDL interpretation/execution unit 31 determines that the job reinstatement/restarting flag is currently on (W9: Yes) and accomplishes the process of comparing the restart page number and the page counter (W10). That is to say, when an interruption instruction is accomplished, it is not necessary to restart the print process for pages that have already been printed and output, for print jobs that were in the process of printing. Consequently, when it is determined that the restart page number is larger than the counter value on the page counter (W10: Yes), the PDL interpretation/execution unit 31 skips over the data on the corresponding pages and does not execute the process of extracting information on the relative address Loc and length len of the above-described image drawing 2 command (W11), or the process of reading image data from the print job file 2 (W12), or the process of creating image data on the basis of the read image data (W13).

In addition, the case of commands to create other image data is similar, and the PDL interpretation/execution unit 31 determines that the job reinstatement/restarting flag is on (W14: Yes) and accomplishes the process of comparing the restart page number and the page counter (W15). Furthermore, when it is determined that the restart page number is larger than the counter value on the page counter (W15: Yes), the PDL interpretation/execution unit 31 does not accomplish the process of the corresponding command (W16). Furthermore, in the case of an update page command, the PDL interpretation/execution unit 31 determines that the job reinstatement/restarting flag is currently on (W17: Yes) and accomplishes the process of comparing the restart page number and the page counter (W18), and when it is determined that the restart page number is larger than the counter value on the page counter (W18: Yes), the process of print process instructions of the engine control unit 24a (W19) is not executed.

Through the above processes, the printing device 1 accomplishes a comparison process of the restart page number and the page counter in the reinstatement/restart process of a temporarily interrupted print job, and can skip and exclude PDL commands for page data prior to the restart page number. Accordingly, the printing device 1 can accomplish the reinstatement process for interrupted print jobs without accomplishing the process of reading the part prior to the restart page number (in other words, accessing the hard drive) for image data parts included in the print data, in particular data with a large data volume, and stored in the print job file 2. In other words, the printing device 1 can accomplish the job reinstatement/restart process after the interruption printing process efficiently and in a short time. That is to say, with the printing device 1, the print job reinstatement process is speeded up, and the performance at the time of interruption reinstatement can be markedly improved. In addition, with the printing device 1 it is possible to improve performance at the time of interruption reinstatement while avoiding cost increases.

When the PDL interpretation/execution unit 31 has determined that the counter value on the page counter exceeds the restart page number (or when the counter value on the page counter matches the restart page number) (W10: No; W15: No; or W18: No), corresponding image data from the job file 2 is skipped over the same as in the above description, and the fact that the printing process is executed on the subsequent pages is the same as in the above description.

In addition, with this embodiment, the user operated the operation panel 27 and ordered a print job that accomplishes the interruption process, but the received print job itself may be given priority. For example, the printing device 1 may specify priority such as urgent/normal, or may specify priority ranking, and may accomplish processes similar to the above.

In this case, for example the client device 30 makes a description relating to priority level at the head of the print job so the priority level can be recognized. Furthermore, the input job storage unit 32 recognizes this priority level and after storing the print job outputs an interruption printing registration request to the interruption control unit 34 for print jobs with high priority levels. When an interruption printing registration request is received, the interruption control unit 34 accomplishes control so that the print job currently being interpreted and executed is interrupted and halted, the print job of the interruption printing registration request is inserted at the head of the input job queue and this print job is interpreted and executed.

In addition, in the description of the above embodiment, a distinction was made between an image drawing command and other PDL commands, so an identifying flag and length were appended by the printer driver of the host machine, but this may be realized without such appending. In this case, the input job storage unit 32 does not accomplish PDL command processes, but accomplishes analysis of PDL commands, and the PDL command is stored in the print job file 1 while the image data is stored in the print job file 2. The image drawing command is converted into an image drawing 2 command.

In addition, a special PDL command having an identifying flag and length as parameters may be used in place of the identifying flag and length.

In addition, in the explanation of the above embodiment, an example was described of a color printer as the printing device, but the embodiment may be similarly implemented even with an all-in-one device such as an MFP or the like.

The present invention can be realized by a printing device equipped with the same functions and composition as the printing device of the above embodiment, and an existing printing device can be made to function as a printing device according to the present invention by applying a program. In this case, this device can be made to function as a printing device according to the present invention by causing a program for realizing the same functions as the functions of the above-described printing control unit 17 to be executed in a computer (CPU or other control unit) of a printing device equipped with the same composition as the printing device 1 illustrated in the above embodiment.

In either case, it is possible to cause an existing device to function as a printing device according to the present invention by applying a program. The method of applying this program is arbitrary, and for example the program can be applied by storing such on a storage medium such as a CD-ROM or memory card or the like, or for example can be applied via a communication medium such as the Internet.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A printing device for executing a print process on the basis of print data including an image inclusion command containing a command part and an image data part, and an image non-inclusion command containing a command part but not containing an image data part, said printing device comprising:
    a conversion unit which converts the command part of the image inclusion command contained in the print data into an internal command;
    a first memory unit which stores the internal command converted by the conversion unit and the image non-inclusion command contained in the print data;
    a second memory unit which stores the image data part of the image inclusion command contained in the print data;
    a restart page number memory unit which stores restart page number information corresponding to a page number for restarting the executed print process, when the print process being executed is interrupted in order to execute an interruption print process; and,
    a control unit that, when restarting the interrupted print process after execution of the interruption print process, reads out the internal command and the image non-inclusion command stored in the first memory unit in the print process up to the page indicated by the restart page number information stored in the restart page number memory unit;
    wherein the control unit, when executing the restarted printing process from the page indicated by the restart page number information, reads out the internal command and image non-inclusion data from the first memory unit, and furthermore reads out from the second memory unit the image data part in accordance with the internal command read out from the first memory unit.

2. The printing device according to claim 1, wherein:
    the conversion unit converts the image data part of the image inclusion command contained in the print data into (a) relative address information for the image data part stored in the second memory unit, and (b) length information of the image data part.

3. The printing device according to claim 1, further comprising an input job queue management unit for (a) changing the sequence of an input job queue and (b) storing the restart page number information into the input job queue which shows the print process being executed and acts as the restart page number memory unit, when the print process being executed is interrupted to execute the interruption print process;
    wherein the control unit reads out and uses the restart page number information from the restart page number memory unit for restarting the interrupted print process after executing the interruption print process.

4. The printing device according to claim 1, wherein the interruption print process is a print process for immediately executing any registered print process in an input job queue in accordance with a user instruction.

5. The printing device according to claim 1, wherein the interruption print process is a print process for immediately executing a print process newly registered to an input job queue in accordance with priority level information appended to the print data.

6. The printing device according to claim 1, wherein the print data is sent from a host device connected via a network and the image inclusion command and the image non-inclusion command are created by the host device.

7. The printing device according to claim 1, further comprising:
    a display unit (a) for displaying job information showing the executed print process registered in an input job queue and job information showing a print process in an execution standby state registered in the input job queue, and (b) for identifiably displaying selected job information out of the job information showing the print process in an execution standby state;
    a key unit for receiving from a user (a) a switching instruction to switch the selected job information and (b) an interruption instruction to execute the interruption print process; and
    an interruption control unit for (a) interrupting execution of the print process being executed in response to the interruption instruction being received by the key unit, and (b) executing an interruption print process displayed by the selected job information.

8. The printing device according to claim 7, wherein a user name is included in the job information displayed on the display unit.

9. The printing device according to claim 7, wherein a job name is included in the job information displayed on the display unit.

10. A printing system comprising a host equipment and a printing device that are connected to each other via a network,
wherein the host equipment (a) creates print data including an image inclusion command containing a command part and an image data part, and an image non-inclusion command containing a command part but not containing an image data part, and (b) sends the created print data to the printing device; and
wherein the printing device comprises:
a receiving unit which receives the print data;
a conversion unit which converts the command part of the image inclusion command contained in the print data into an internal command;
a first memory unit which stores the internal command converted by the conversion unit and the image non-inclusion command contained in the print data;
a second memory unit which stores the image data part of the image inclusion command contained in the print data;
a restart page number memory unit which stores restart page number information corresponding to a page number for restarting the executed print process, when the print process being executed is interrupted in order to execute an interruption print process; and,
a control unit that, when restarting the interrupted print process after execution of the interruption print process, reads out the internal command and the image non-inclusion command stored in the first memory unit in the print process up to the page indicated by the restart page number information stored in the restart page number memory unit;
wherein the control unit, when executing the restarted printing process from the page indicated by the restart page number information, reads out the internal command and image non-inclusion data from the first memory unit, and furthermore reads out from the second memory unit the image data part in accordance with the internal command read out from the first memory unit.

11. A printing control method for executing a print process on the basis of print data including an image inclusion command containing a command part and an image data part, and an image non-inclusion command containing a command part but not containing an image data part, said printing control method comprising:
a step which converts the command part of the image inclusion command contained in the print data into an internal command;
a step which stores in a first memory unit the internal command converted by the conversion unit and the image non-inclusion command contained in the print data;
a step which stores in a second memory unit the image data part of the image inclusion command contained in the print data;
a step which stores, in a restart page number memory unit, restart page number information corresponding to a page number for restarting the executed print process, when the print process being executed is interrupted in order to execute an interruption print process;
a step which, when restarting the interrupted print process after execution of the interruption print process, reads out the internal command and the image non-inclusion command stored in the first memory unit in the print process up to the page indicated by the restart page number information stored in the restart page number memory unit; and
a step which, when executing the restarted printing process from the page indicated by the restart page number information, reads out the internal command and image non-inclusion data from the first memory unit, and furthermore reads out from the second memory unit the image data part in accordance with the internal command read out from the first memory unit.

12. The printing control method according to claim 11, wherein in the conversion step the image data part of the image inclusion command contained in the print data is converted into (a) a relative address location for the image data part recorded in the second memory unit, and (b) length information of the image data part.

13. The printing control method according to claim 11, further comprising:
a display step (a) for displaying job information showing the executed print process registered in an input job queue and job information showing a print process in an execution standby state registered in the input job queue, and (b) for identifiably displaying selected job information out of the job information showing the print process in an execution standby state;
a receiving step for receiving from a user (a) a switching instruction to switch the selected job information and (b) an interruption instruction to execute the interruption print process; and
an interruption control step for (a) interrupting execution of the print process being executed in response to the interruption instruction being received by the key unit, and (b) executing an interruption print process displayed by the selected job information.

14. The printing control method according to claim 13, wherein a user name is included in the displayed job information.

15. The printing control method according to claim 13, wherein a job name is included in the displayed job information.

16. A non-transitory computer-readable recording medium for storing a program that causes a computer to execute a print process on the basis of print data including an image inclusion command containing a command part and an image data part, and an image non-inclusion command containing a command part but not containing an image data part, said program causing the computer to execute:
a step which converts the command part of the image inclusion command contained in the print data into an internal command;
a step which stores in a first memory unit the internal command converted by the conversion unit and the image non-inclusion command contained in the print data;
a step which stores in a second memory unit the image data part of the image inclusion command contained in the print data;
a step which stores, in a restart page number memory unit, restart page number information corresponding to a page number for restarting the executed print process, when the print process being executed is interrupted in order to execute an interruption print process;
a step which, when restarting the interrupted print process after execution of the interruption print process, reads out the internal command and the image non-inclusion command stored in the first memory unit in the print process up to the page indicated by the restart page number information stored in the restart page number memory unit; and a step which, when executing the restarted printing process from the page indicated by the restart page number information, reads out the internal command and image non-inclusion data from the first memory unit, and furthermore reads out from the second memory unit the image data part in accordance with the internal command read out from the first memory unit.

17. The recording medium according to claim 16, wherein in the conversion step the image data part of the image inclusion command contained in the print data is converted into (a) a relative address location for the image data part recorded in the second memory unit, and (b) length information of the image data part.

18. The recording medium according to claim 16, wherein the program further causes the computer to execute:

a display step (a) for displaying job information showing the executed print process registered in an input job queue and job information showing a print process in an execution standby state registered in the input job queue, and (b) for identifiably displaying selected job information out of the job information showing the print process in an execution standby state;

a receiving step for receiving from a user (a) a switching instruction to switch the selected job information and (b) an interruption instruction to execute the interruption print process; and an interruption control step for (a) interrupting execution of the print process being executed in response to the interruption instruction being received by the key unit, and (b) executing an interruption print process displayed by the selected job information.

19. The recording medium according to claim 18 wherein a user name is included in the displayed job information.

20. The recording medium according to claim 18 wherein a job name is included in the displayed job information.

* * * * *